(12) United States Patent
Mitteer et al.

(10) Patent No.: US 12,497,963 B2
(45) Date of Patent: Dec. 16, 2025

(54) CONTROL SYSTEM FOR A SMART PUMP LOCATED WITHIN A LUBRICATION/COOLING ASSEMBLY

(71) Applicant: GHSP, INC., Holland, MI (US)

(72) Inventors: David Michael Mitteer, Shelby, MI (US); Nathaniel Joseph McMackin, New Era, MI (US); Paul Anders Christensen, Whitehall, MI (US)

(73) Assignee: GHSP, Inc., Holland, MI (US)

( * ) Notice: Subject to any disclaimer, the term of this patent is extended or adjusted under 35 U.S.C. 154(b) by 50 days.

(21) Appl. No.: 18/264,642

(22) PCT Filed: Mar. 3, 2022

(86) PCT No.: PCT/IB2022/051885
§ 371 (c)(1),
(2) Date: Aug. 8, 2023

(87) PCT Pub. No.: WO2022/185247
PCT Pub. Date: Sep. 9, 2022

(65) Prior Publication Data
US 2024/0120809 A1    Apr. 11, 2024

Related U.S. Application Data

(60) Provisional application No. 63/155,995, filed on Mar. 3, 2021.

(51) Int. Cl.
*F04C 2/10*    (2006.01)
*F04C 13/00*    (2006.01)
(Continued)

(52) U.S. Cl.
CPC ............ *F04C 13/005* (2013.01); *F04C 2/102* (2013.01); *H02K 7/14* (2013.01); *H02K 11/21* (2016.01);
(Continued)

(58) Field of Classification Search
CPC .... F04C 2/102; F04C 13/005; F04C 2240/40; F04C 2240/81; F04C 2270/03; F04C 2270/06; F04C 2270/19
See application file for complete search history.

(56) References Cited

U.S. PATENT DOCUMENTS 5,997,262 A * 12/1999 Finkbeiner .............. F04C 15/06
418/166
6,912,479 B2    6/2005 Ryu et al.
(Continued)

FOREIGN PATENT DOCUMENTS

WO    2020167782 A1    8/2020
WO    2022058132 A1    3/2022

*Primary Examiner* — Connor J Tremarche
(74) *Attorney, Agent, or Firm* — Price Heneveld LLP

(57) ABSTRACT

A fluid pump includes a motor disposed within an outer housing. The motor includes a stator and a rotor in electromagnetic communication with the stator. Windings are disposed on the stator that receive an electric current for defining the electromagnetic communication. A pump element is attached to the rotor via a drive shaft. The pump element operates with the rotor to deliver a fluid through a hydraulic fluid path. A plurality of sensors measure information related to at least one of the stator, the windings, the rotor, the pump element, the fluid and the hydraulic fluid path. A controller is in communication with the windings for delivering the electric current to the windings. The controller is also in communication with the plurality of sensors for measuring and recording the information and communicating this information to one of an external memory and an external controller.

20 Claims, 24 Drawing Sheets

(51) Int. Cl.
*H02K 7/14* (2006.01)
*H02K 11/21* (2016.01)
*H02K 11/30* (2016.01)

(52) U.S. Cl.
CPC .......... *H02K 11/30* (2016.01); *F04C 2240/40* (2013.01); *F04C 2240/81* (2013.01); *F04C 2270/03* (2013.01); *F04C 2270/06* (2013.01); *F04C 2270/19* (2013.01)

(56) References Cited

U.S. PATENT DOCUMENTS

| | | | |
|---|---|---|---|
| 7,927,079 B2 | 4/2011 | Suzuki et al. | |
| 9,921,116 B2 | 3/2018 | Inan et al. | |
| 10,112,222 B1* | 10/2018 | Davis | F04B 23/021 |
| 10,436,228 B2 | 10/2019 | Kemnitz et al. | |
| 10,629,005 B1* | 4/2020 | Brown | G07C 5/0841 |
| 10,962,009 B2 | 3/2021 | Pham et al. | |
| 2004/0128107 A1 | 7/2004 | Ryu et al. | |
| 2008/0075608 A1* | 3/2008 | Suzuki | F04C 14/08 |
| | | | 417/410.1 |
| 2011/0129356 A1 | 6/2011 | Kobayashi et al. | |
| 2011/0133678 A1* | 6/2011 | Tomigashi | H02P 27/08 |
| | | | 318/400.04 |
| 2013/0197757 A1* | 8/2013 | Ellis | B62D 6/007 |
| | | | 701/41 |
| 2014/0369879 A1* | 12/2014 | Friedman | F04C 2/084 |
| | | | 418/61.3 |
| 2016/0233814 A1 | 8/2016 | Okamoto et al. | |
| 2016/0290498 A1 | 10/2016 | Inan et al. | |
| 2017/0057667 A1* | 3/2017 | Ward | B64F 5/60 |
| 2018/0038395 A1* | 2/2018 | Kemnitz | F04C 2/101 |
| 2018/0105156 A1* | 4/2018 | Kishi | B60T 13/745 |
| 2018/0238955 A1* | 8/2018 | Bango | G08B 21/02 |
| 2019/0017508 A1 | 1/2019 | Pham et al. | |
| 2019/0064034 A1* | 2/2019 | Fayfield | G05B 23/0289 |
| 2019/0301480 A1 | 10/2019 | Ojima et al. | |
| 2019/0353156 A1* | 11/2019 | Ward | F04B 49/065 |
| 2020/0340472 A1 | 10/2020 | Blankemeier et al. | |
| 2021/0281207 A1* | 9/2021 | Mueller | H02P 27/08 |

* cited by examiner

CONTROL SYSTEM FOR A SMART PUMP LOCATED WITHIN A LUBRICATION/COOLING ASSEMBLY

FIELD OF THE DISCLOSURE

The present disclosure generally relates to fluid pumps, and more specifically, a fluid pump having a control system that utilizes various sensors and algorithms for assessing the efficiency, health and status of the fluid pump as well as the fluid being moved through the fluid pump.

BACKGROUND OF THE DISCLOSURE

Within various fluid mechanisms, a fluid pump is used for delivering material for lubricating and/or cooling functions within the fluid-delivery system. This fluid pump can include various controls for monitoring the status of the fluid pump.

SUMMARY OF THE DISCLOSURE

According to a first aspect of the present disclosure, a fluid pump includes an outer housing. A motor is disposed within the outer housing. The motor includes a stator and a rotor in electromagnetic communication with the stator. Windings are disposed on the stator that receive an electric current for defining the electromagnetic communication. A pump element is attached to the rotor via a drive shaft. The pump element operates with the rotor to deliver a fluid through a hydraulic fluid path. A plurality of sensors measure information related to at least one of the stator, the windings, the rotor, the pump element, the fluid and the hydraulic fluid path. A controller is in communication with the windings for delivering the electric current to the windings. The controller is also in communication with the plurality of sensors for measuring and recording the information and communicating this information to one of an external memory and an external controller.

According to another aspect of the present disclosure, a vehicle includes a fluid delivery system. An electrical system includes a data system. The fluid system and the electrical system are each in communication with a fluid pump. The fluid pump comprises an outer housing. A motor is disposed within the outer housing. The motor includes a stator and a rotor in electromagnetic communication with the stator. Windings are disposed on the stator that receive an electric current from the electrical system for defining the electromagnetic communication. A pump element is attached to the rotor via a drive shaft. The pump element operates with the rotor to deliver a fluid from the fluid delivery system and through a hydraulic fluid path of the fluid pump. A plurality of sensors measure information related to at least one of the stator, the windings, the rotor, the pump element, the fluid and the hydraulic fluid path. A controller is in communication with the windings for delivering the electric current to the windings. The controller is also in communication with the plurality of sensors for measuring and recording the information and communicating this information to one of an external memory of the electrical system and an external controller of the electrical system.

According to another aspect of the present disclosure, a fluid pump includes a stator disposed within an outer housing. Windings are disposed on the stator. A rotor is positioned relative to the stator. A pump element is attached to the rotor via a drive shaft. The pump element operates with the rotor to deliver a fluid through a hydraulic fluid path. A plurality of sensors measure information related to at least one of the stator, the windings, the rotor, the pump element, the fluid and the hydraulic fluid path. A controller is in communication with the windings for delivering an electric current to the windings. The controller is also in communication with the plurality of sensors for measuring and recording the information and communicating this information for reporting.

According to another aspect of the present disclosure, a method for operating a fluid pump within a vehicle includes a fluid delivery system, an electrical system and a data system that are each in communication with the fluid pump. The method includes operating a motor using a controller. The motor includes a rotor that is in electromagnetic communication with a stator having windings disposed thereon. The rotor rotationally operates a pump element. The method also includes moving a fluid through a hydraulic fluid path using the pump element. The method also includes monitoring a plurality of parameters using a plurality of sensors that are in communication with the controller. The plurality of parameters are related to at least one of the controller, the motor, the fluid and the hydraulic fluid path. The method also includes operating an onboard control algorithm using the controller and the plurality of sensors to determine an output related to an operational condition of said fluid pump. The method also includes delivering a communication related to the output to one of an internal memory, an external memory and an external controller.

These and other aspects, objects, and features of the present disclosure will be understood and appreciated by those skilled in the art upon studying the following specification, claims, and appended drawings.

DETAILED DESCRIPTION

Figure 1:
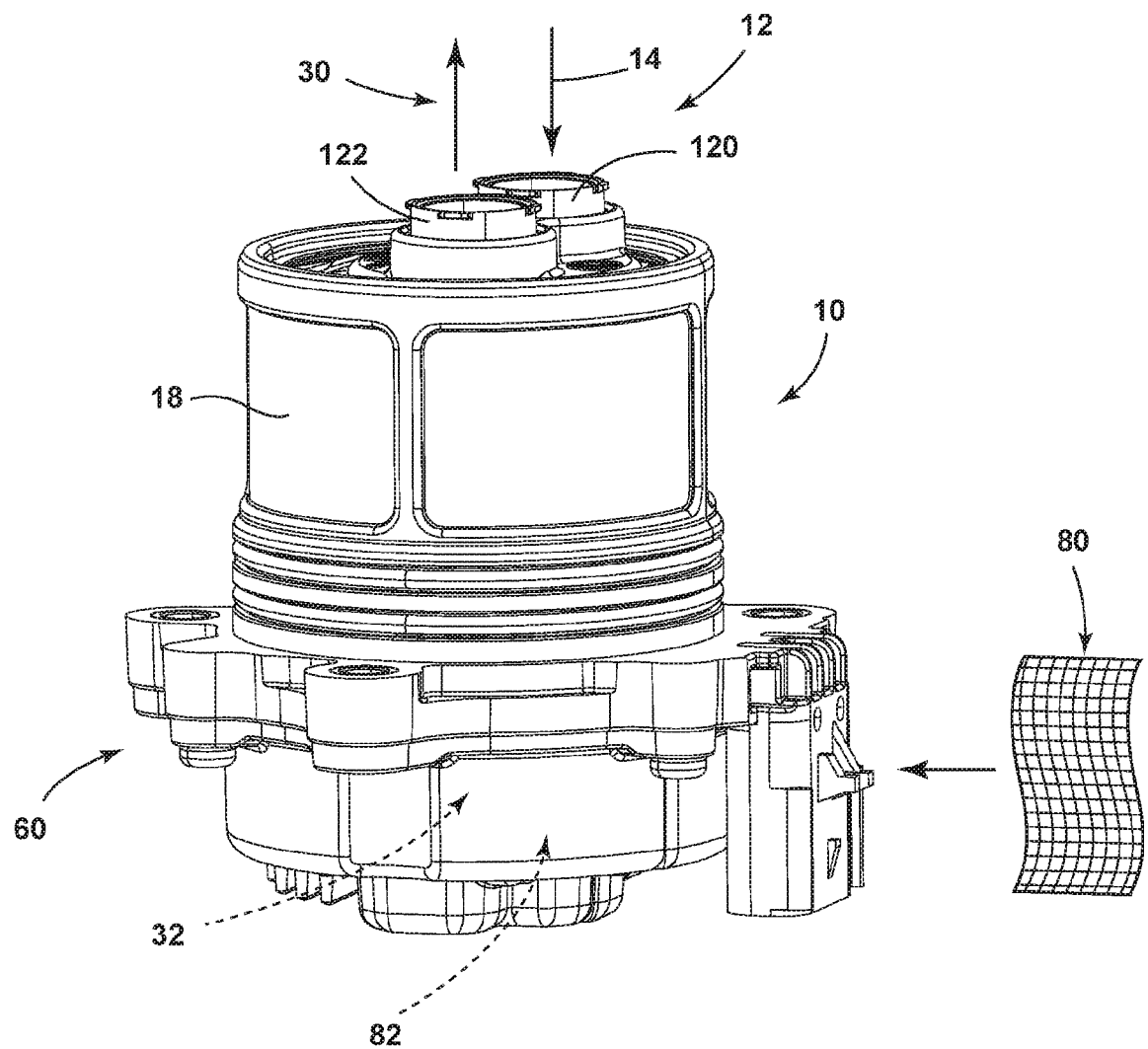
FIG. 1 is perspective view of an aspect of a fluid pump utilized within a fluid-delivery system.
Figure 2:
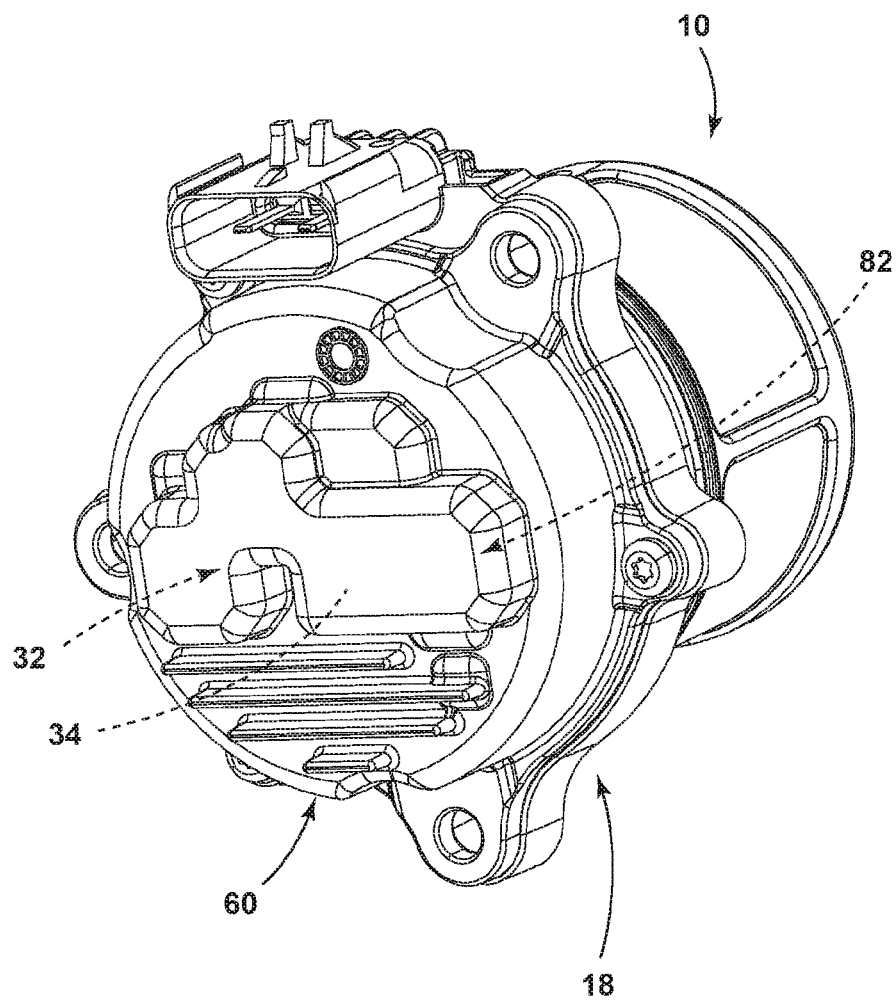
FIG. 2 is a second perspective view of an aspect of a fluid pump utilized within a fluid-delivery system.
Figure 3:
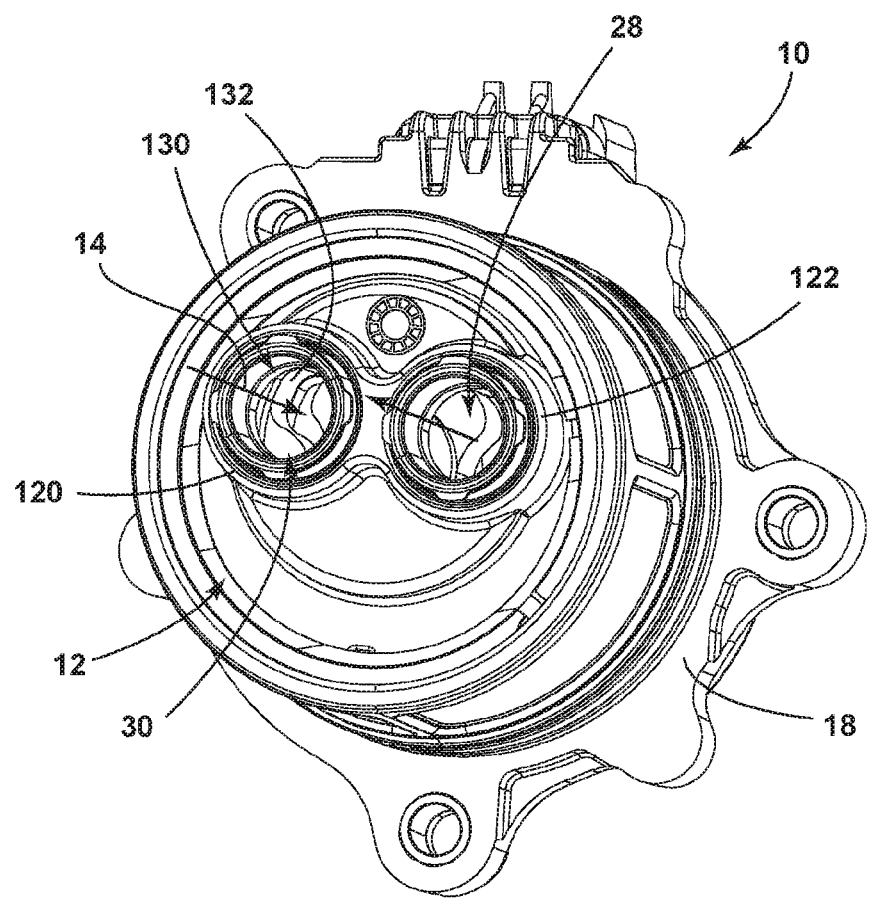
FIG. 3 is a third perspective view of an aspect of a fluid pump utilized within a fluid-delivery system.
Figure 4:
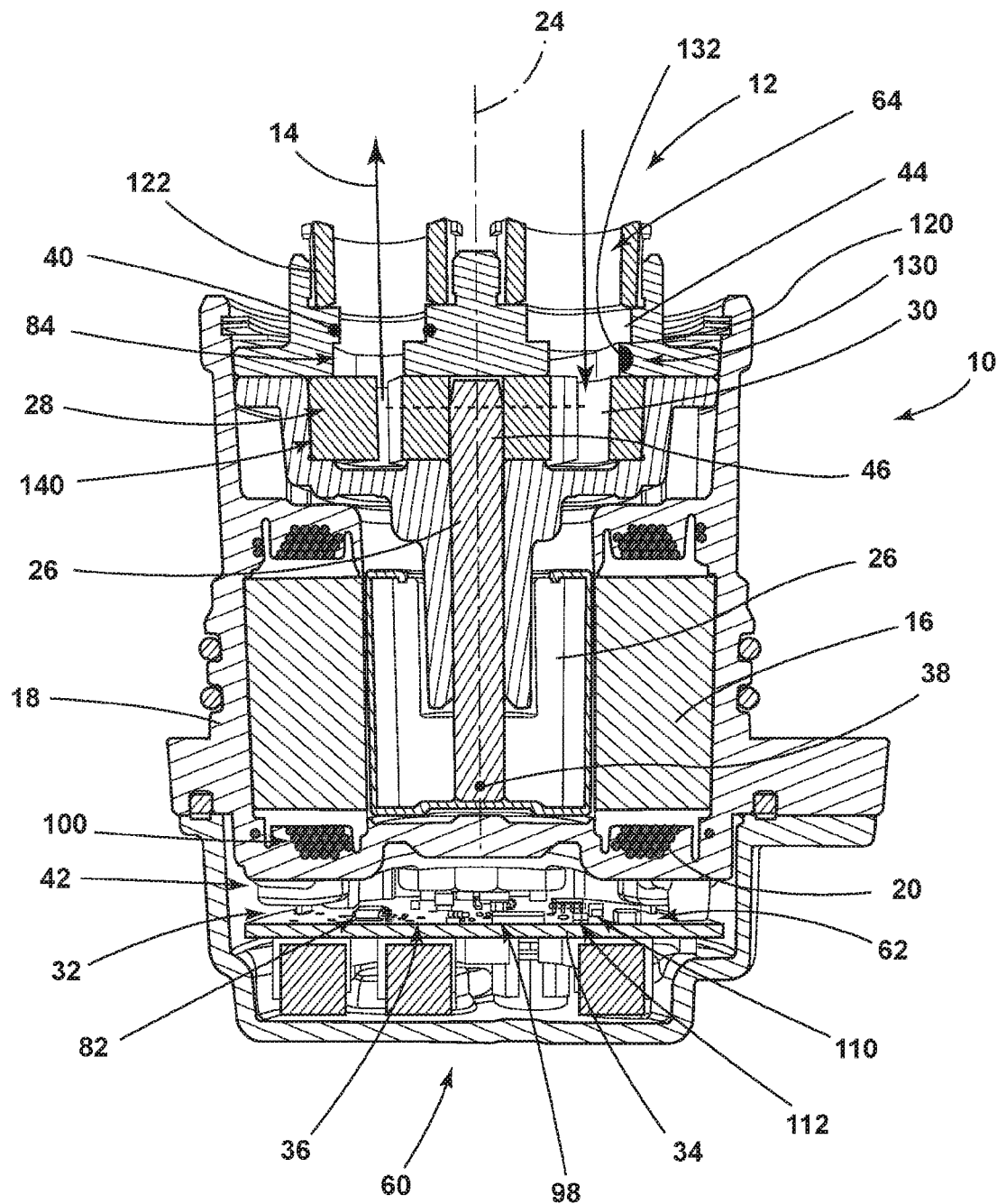
FIG. 4 is a cross-sectional view of an aspect of a fluid pump utilized within a fluid-delivery system.
Figure 5:
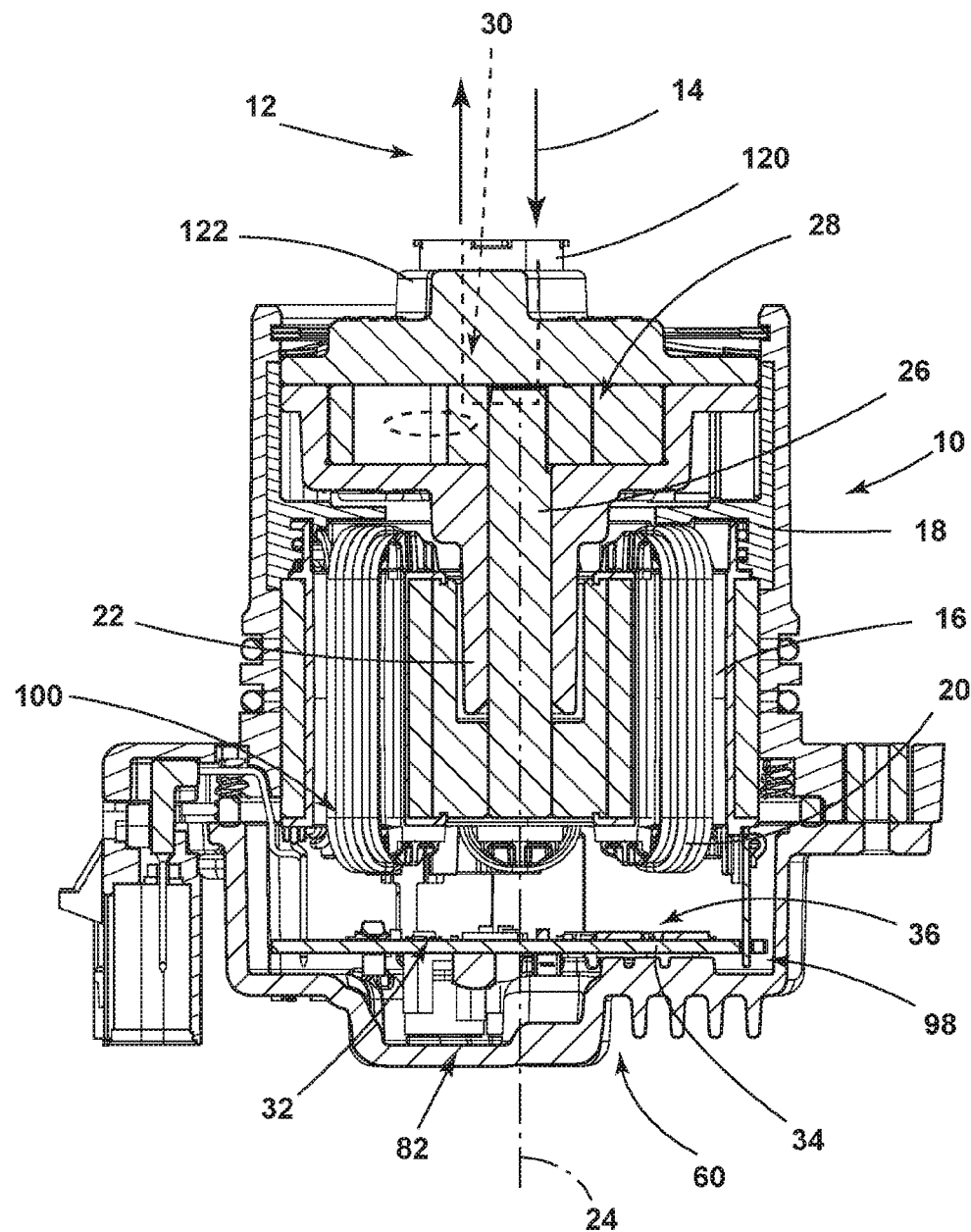
FIG. 5 is a cross-sectional view of an aspect of a fluid pump utilized within a fluid-delivery system.

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-6, reference numeral 10 generally refers to a fluid pump that is used within a fluid-delivery system 12 for delivering a fluid 14 from one position to another. This fluid 14 can be used for various functions within a mechanical assembly. Such functions can include, but are not limited to, lubricating and/or cooling functions within the fluid-delivery system 12. Typically, the fluid pump 10 described herein is a lubricant or coolant that is used for lubricating and/or cooling a separate mechanism within a vehicular application or other mechanical setting. According to the various aspects of the device, the fluid pump 10 typically includes a motor 100 having a stator 16 that is in electromagnetic communication with a rotor 22. The stator 16 is overmolded or insert injection molded to form a housing 18. Various windings 20 extend around the stator 16. When the windings 20 are energized via an electrical current, electromagnetic fields are generated relative to the stator 16 and cooperate with a rotor 22 positioned within the stator 16 (or around the stator 16 in inner-stator configurations) to rotate the rotor 22 about a rotational axis 24. An electromotive force generated between the electromagnetic engagement of the stator 16 with the rotor 22 causes the rotor 22 to rotate a drive shaft 26 about a rotational axis 24. The drive shaft 26 is, in turn, connected with a pump element 28 that is used to move the fluid 14 from one position to another. Typically, fluid 14 is moved from a reservoir through a hydraulic fluid path 30 and to a drive unit or other mechanical assembly. Typically, the drive unit can be in the form of an engine, transmission, differential, or other similar mechanical assembly.

Referring again to FIGS. 1-6, the fluid pump 10 typically includes a controller 32 that can be disposed within a portion of the housing 18. This controller 32 can be part of a printed circuit board (PCB) 34 that is configured to regulate the delivery of electricity to the windings 20 for the stator 16. This controller 32 can also be coupled to various sensors 36 that are used to monitor the status of the fluid pump 10 as well as the fluid 14 moving through the hydraulic fluid path 30. The PCB 34 can also include various sensors 36 that are also used to measure and determine various performance parameters, directly and/or indirectly, to assess the health, performance, age, and effectiveness of the fluid pump 10, the fluid 14 moving therethrough and the mechanical assembly served by the fluid pump 10. These sensors 36 can include, but are not limited to, accelerometers 38, optic sensors 40, current sensors 42, temperature sensors 44, torque sensors 46 and other similar sensors 36, as will be described more fully herein, that can be used to monitor various aspects of the fluid pump 10 and the fluid 14 moving therethrough.

Referring to FIGS. 1-7, the controller 32 can include a memory 82 within the PCB, such as an internal memory. The controller 32 can also be in communication with an external memory of the mechanical assembly. The mechanical assembly can be in the form of a vehicle 160 (shown in FIG. 7), fixture or other similar electro-mechanical mechanism that includes a fluid-delivery system 12. In the case of a vehicle 160, the vehicle 160 can include a fluid-delivery system 12 that provides fluid 14 to the fluid pump 10. The vehicle 160 can also include an electrical system 164 that provides an electrical current to the fluid pump 10 and the electrical components contained therein. The electrical system 164 of the vehicle 160 can also include a data and communications system 166 that is used to send, receive and deliver data communications throughout the vehicle 160, including the fluid pump 10. The data and communications system 166 of the vehicle 160 can also be used to send and receive data with respect to external locations outside of the vehicle 160, such as through a wired or wireless communication.

Referring again to FIGS. 1-6, the fluid pump 10 can include an accelerometer 38 that is attached to, or at least in communication with, one of the rotationally operable elements of the fluid pump 10, such as the pump element 28, the drive shaft 26, rotor 22, or other similar component within the fluid pump 10. This accelerometer 38 monitors operating shock events where the rotational speed of one of the components of the fluid pump 10 drastically changes in a short period of time. Operating shock events can be produced by debris 64 moving through the pump element 28 and temporarily jamming, or otherwise interrupting operation of, the pump element 28. The operating shock events can also be produced by external forces that are exerted on the fluid pump 10, cogging that may occur between the stator 16 and rotor 22, and other similar events that can cause a sudden change in rotational speed of the rotational components of the fluid pump 10. The accelerometer 38 cooperates with the controller 32 to monitor and compare certain operating shock events with other operating shock events that may have been previously experienced by the fluid pump 10. The controller 32 evaluates these various operating shock events individually and also compares the various operating shock events cumulatively over time. This cumulative analysis derives an internal acceptance threshold for future operating shock events. This internal acceptance threshold produces a calculated tolerance level for evaluating future operating shock events that may subsequently occur.

Subsequent operating shock events that occur are measured by the accelerometer 38 and evaluated by the controller 32 of the fluid pump 10 against the derived threshold. When the derived threshold for operating shock events is exceeded, the controller 32 timestamps the occurrence as a mechanical shock risk event. This mechanical shock risk event is communicated to the controller 32 and the vehicle 160 for later reporting. This reporting may occur during a service of the vehicle 160. In addition, the mechanical shock risk event can also be reported in real time for reporting to the vehicle 160 or a remote location. Typically, when a health report regarding the vehicle 160 is requested, the recorded mechanical shock risk event is included within a report concerning the vehicle 160. These reports are accumulated such that a service recommendation can be made and implemented concerning the vehicle 160 and the fluid pump 10 having the accelerometer 38. The mechanical shock risk event can be used to determine if the operating shock event was significant enough to warrant servicing, repair or replacement. The mechanical shock risk event can also be used in combination with a visual inspection to determine the level of damage, if any, to the components of the fluid pump 10. As a general matter, the reporting of data and events can be performed according to any one of various methods, as will be described more fully below.

Referring again to FIGS. 1-6, the fluid pump 10 can include an optic sensor 40 that is in communication with the controller 32. This optic sensor 40 can include an emitter and a receiver within one or more portions of the hydraulic fluid path 30 that is in communication with the fluid pump 10. This optic sensor 40 can be positioned within the hydraulic fluid path 30, within the fluid pump 10, within a portion of the hydraulic fluid path 30 outside of the fluid pump 10, or near the hydraulic fluid path 30 and in communication with the flow of fluid 14 through the hydraulic fluid path 30. Using the optic sensor 40, the emitter and receiver are capable of detecting the clarity of the fluid 14 within the hydraulic fluid path 30. This clarity is detected by monitoring a relative change in light detection at the receiver. Stated another way, an emitter emits a light or other wavelength through the fluid 14. The receiver captures this wavelength that is filtered through the fluid 14 and monitors the relative translucency of the wavelength being emitted through the fluid 14. This relative translucency is monitored over time to assess the clarity of the fluid 14. This clarity can be used to assess the effectiveness of the fluid 14, the effective lifespan of the fluid 14, whether the fluid 14 or fluid filter needs to be replaced, or other components of the hydraulic fluid path 30 needs to be serviced, replaced, or otherwise maintained.

In certain aspects of the device, the optic sensor 40 can include an emitter that emits photons toward the receiver. As the photons engage the fluid 14 moving through the hydraulic fluid path 30, photons are reflected or refracted away from the receiver or are directed to the receiver through the fluid 14. Based upon the amount of photons that are received by the receiver, certain clarity data can be measured, derived, extrapolated, or otherwise assessed during operation of the optic sensor 40.

The fluid pump 10 can include a combination of sensors 36 that can be used cooperatively for assessing certain status information 60 regarding the fluid pump 10 and the fluid 14 moving therethrough. A run-time sensor 62 and a temperature sensor 44, such as a micro temperature sensor, can be used in combination to determine a percentage of oil life. Changes in the temperature of the fluid 14 over time, as measured by a run-time reading of the run-time sensor 62, and at certain run times during an operative cycle of fluid pump 10, can be indicative of particles and other debris 64 being contained within the fluid 14. These changes in temperature measured by the micro temperature sensor 44 can, in turn, indicate when the fluid 14 should be replaced, a fluid filter should be replaced, or both. The run-time sensor 62 and micro temperature sensor 44 could be used to determine a percentage of life remaining of the fluid 14 being moved through the fluid pump 10.

Referring again to FIGS. 1-6, certain status information 60 can be derived by using a plurality of sensors 36. In certain instances, the temperature of the fluid 14 can be assessed without the use of a temperature sensor 44. In such an aspect of the device, the controller 32 for the fluid pump 10 can determine, estimate, or otherwise derive a fluid temperature based upon various information tables 80 that can be stored within a memory 82 on the PCB 34, such as an internal memory, or an external memory within the vehicle 160.

In an exemplary aspect of the device, the information tables 80 can relate to speed or flow rate of fluid 14 and electrical current being drawn by, or delivered to, the windings 20 of the stator 16. Such a system can be utilized where the hydraulic fluid path 30 includes a set restriction 84, such as in a lubricating or cooling application. Within this set restriction 84, the speed or flow rate of the fluid 14 can be maintained at a constant through the restriction 84. The fluid 14 becomes more contaminated with debris 64 over time, resulting in a more viscous state of the fluid 14. As a result, the amount of electrical current that the windings 20 draw to drive the pump element 28 and move the fluid 14 at a constant flow rate typically increases due to this increased viscosity of the fluid 14. This increase in drawn electrical current can result in a corresponding increase in temperature of the fluid 14. The various information tables 80 can be derived through product testing of the specific fluid pump 10 in a specific application, or can be more generalized tables of data that correspond to the flow rate or speed of the fluid 14 and electrical current drawn in a lubricating and/or cooling application for a fluid pump 10. In addition, within the hydraulic fluid path 30, certain restrictive areas, such as a narrowed portion, can be utilized for assessing the speed or flow rate of the fluid 14. At these restrictions 84, various data points can be recorded and compared with the electrical current being provided to the stator 16 for operating the rotor 22 and the pump element 28. Through such a configuration, multiple data points and comparisons of data points can be achieved for more accurately estimating the temperature of the fluid 14 being moved through the hydraulic fluid path 30.

Referring again to FIGS. 1-6, the controller 32 for the fluid pump 10 can include a single-shunt field-oriented control algorithm 98 that is coupled with the motor 100, typically in the form of a single phase of a three-phase motor 100. Typically, the three-phase motor 100 includes U, V and W phase windings having corresponding windings 20 of the stator 16. These three phases deliver electrical current to the three corresponding sets of windings 20 for the stator 16 that correspond to the three separate phases of the motor 100. The single-shunt field-oriented control algorithm 98 can utilize a one-shunt sensing implementation that senses the current through the dedicated circuit of the three-phase motor 100 at specific points and intervals within a cycle of the motor 100. Using the single-shunt field-oriented control algorithm 98, an estimate of the root mean square (RMS) phase current for each of the U, V and W phase windings can be estimated. Again, this is accomplished by measuring the current within typically only one of the U, V and W phase windings of the three phase electric motor 100. The RMS phase can be used to express an average current or voltage within an electrical circuit. This average current or voltage can then be delivered for recording and eventual reporting of the status of the motor 100 for the fluid pump 10. The single-shunt field-oriented control algorithm 98 can be coupled with any one of the U, V and W phase windings of the motor 100. In each instance, the current in one of the phases is directly measured and the current in the remaining two phases can be estimated. This estimation can be derived, in part, through the use of additional sensors 36 that monitor an operational aspect of the motor 100 and the fluid pump 10, such as a rotational speed sensor for monitoring rotational speed of the rotor 22, a torque sensor for monitoring the torque output of the rotor 22 or the pump element, a fluid flow sensor for monitoring a flow rate of the fluid through the hydraulic fluid path 30, combinations thereof and other parameters. Again, the results of the monitoring is reported to the controller 32 and the vehicle 160 and is ultimately reported during service visits for the vehicle 160. The recorded data can be used for determining whether the fluid pump 10 is operating efficiently or whether any issues are present within the fluid pump 10 that require maintenance or placement.

Referring again to FIGS. 1-6, a positive temperature coefficient (PTC) resistor 112 can be positioned near the field-effect transistor (FET) 110 for a circuit of the controller 32. The positive temperature coefficient resistor 112 monitors and reports a bridge temperature at the FET 110 due to a change in the electrical resistance across the located PTC resistor 112. Accordingly, the PTC resistor 112 can be used to monitor the temperature at the FET 110. These temperature readings can be used to estimate a current that is moving through the FET 110 during operation of the motor 100 and the fluid pump 10, such as the amount of electrical current drawn by the windings 20. This information, in turn, can be used to assess the health and performance of the fluid pump 10. Reporting the monitored temperature values can be uploaded for reporting at service calls or during maintenance checks on a vehicle 160.

Referring again to FIGS. 1-6, the fluid pump 10 can include a field-oriented control algorithm 98 that is contained within or in communication with the controller 32 for the fluid pump 10. The field-oriented control algorithm 98 monitors the status of the electro-magnetic interaction between the stator 16 and rotor 22 to assess whether the motor 100 is a closed-loop control state, an open-loop control state, or a phase-advanced state. Each of these states have advantages that can be achieved in relation to a particular operating mode of the motor 100, as will be described more fully below. Accordingly, the controller 32 can modify the state of the motor between the closed-loop control state, the open-loop control state, or the phase-advanced state and use the PTC resistor 112 to confirm that the change in state has occurred.

Typically, the closed-loop control state utilizes system feedback from the motor 100. This feedback can include motor signals such as current drawn by the windings 20 and position of the rotor 22 with respect to the stator 16. The control system then uses the feedback signals to regulate the voltage that is applied to, or the amount of current drawn by, the windings 20 to maintain the rotor 22 at a consistent rotational rate. In turn, the field-oriented control can be used to implement various magnitudes of torque, speed and position control of the motor 100 for the fluid pump 10. The closed-loop control state of the motor 100 also provides effective control and capability over the maximum torque and speed ranges for the motor 100 for the fluid pump 10. The closed-loop control state can utilize real-time position and stator current feedback to fine-tune the speed control and current control to modify the duty cycles of the inverter that is coupled to the motor 100 for the fluid pump 10. This insures that a corrective three-phase voltage supply is used to correct the motor feedback with respect to a deviation from a desired value.

The open-loop control state typically does not require or utilize feedback from the motor 100. Rather, the open-loop control state utilizes the supply voltage amplitude in proportion to its frequency. Because the open-loop control state does not consider external conditions, such as position of the rotor 22, the open-loop control state is not typically used to correct deviations between the desired and actual motor speeds. For this reason, it is frequent that open-loop control states and closed-loop control states transition between one another over use of the motor 100. As discussed above, the field-oriented control algorithm 98 is used to monitor these transitions between the open-loop control state and the closed-loop control state.

Additionally, the motor 100 can operate in a phase-advanced state of the motor 100. In the phase-advanced state, the motor 100 can operate at faster speeds that are typically beyond the maximum rated speeds. While moving at faster speeds, it is typical that the motor 100 also operates at a lower torque. Again, the field-oriented control algorithm 98 is a software-based system that monitors the control state of the motor 100 to determine whether the closed-loop control state, the open-loop control state, or the phase-advanced state is being utilized for controlling the motor 100 of the fluid pump 10. As the field-oriented control algorithm 98 monitors these transitions between the various states, the controller 32 communicates these transitions, and when they occur, to the controller 32 and/or the vehicle 160 so that they can be reported upon request.

According to various aspects of the device, the controller 32 for the fluid pump 10 can contain a memory 82 that can be used to determine whether certain software has been updated since the date of manufacture. In certain aspects, a single bit or series of bits can be used as a memory 82, such as a random-access memory (RAM), to determine whether certain software updates have been uploaded. Once a certain software update has been uploaded, the bit of the RAM can shift from negative to positive, or vice versa. Accordingly, this single-bit memory can be used to positively or negatively affirm whether a certain software update has been provided and uploaded to the controller 32 for the fluid pump 10.

In addition, these memory bits used to monitor the most recent software update for the fluid pump 10 can also include basic statistical information related to the manufacture of the fluid pump 10. This information can include a manufacturing date, manufacturing location, model number and other similar information related to the manufacturer of the fluid pump 10 or a component of the fluid pump 10. Typically, such information will be embedded in the memory 82, such as a read-only memory, for the controller 32, such as within an information table 80. This information is generally factual information about the fluid pump 10 that will not change over time. This factual information related to the manufacture date can be used to monitor the age of the fluid pump 10, date of manufacture in relation to software updates, and other similar date and age-related information with respect to the fluid pump 10.

Referring again to FIGS. 1-6, the sensors 36 included within the fluid pump 10 can be utilized for monitoring whether an obstruction, constriction, or other restricted portion of the hydraulic fluid path 30 is present within the fluid pump 10 or the fluid flow system. A current sensor 42 can monitor a current that is delivered to the various windings 20 of the motor 100. These values that are obtained by the current sensor 42 can be compared to various information tables 80 and tables of values that are stored within a memory 82 of the fluid pump 10 or a memory 82 of the vehicle 160. This comparison of current values against the table of values can be used for identifying current that is too low. Where current is too low, the pump element 28 can be described as starving for oil. Stated another way, the amount of oil moving through the pump element 28 is low such that there is little fluid restriction 84 and a lower current is required for maintaining the pump element 28 at a desired rotational rate. Where the pump element 28 is starving and the current sensor 42 measures a current that is too low, a restriction 84 on the inlet side 120 or suction side of the fluid pump 10 can be indicated. Conversely, a restriction 84 on the outlet side 122 of the fluid pump 10 can result in a build-up of fluid 14 within the pump element 28. This buildup of fluid 14 within the pump element 28 results in an increased fluid resistance. Accordingly, the windings 20 draw an increased amount of electrical current to maintain operation of the rotor 22 and the pump element 28 at a desired consistent rotational rate. Again, the current sensor 42 can monitor a current delivered to the windings 20 and compare this value to various tables that are stored within a memory 82 of the fluid pump 10. Where the current delivered to the windings 20 for the motor 100 is too high or too low, these events can be stored within a memory 82 for reporting at a later time.

Referring again to FIGS. 1-6, the controller 32 for the fluid pump 10 can include a control algorithm 98 that internally measures an input voltage (using a voltage sensor) delivered to the windings 20, an electrical current (using a current sensor) drawn by the windings 20 of the stator 16 of the fluid pump 10 and a temperature (using a temperature sensor 44) of a portion of the fluid pump 10 and/or the fluid 14 moving through the fluid pump 10. These values are compared to derive a resulting electrical resistance value. This resulting electrical resistance value is compared to values of information tables 80 that are stored in the memory 82 of the fluid pump 10. These information tables 80 can contain a table with normal resistance values that are observed during normal operation of the fluid pump 10. Where this electrical resistance value has increased beyond the normal resistance values contained within the table, this can be indicative of a defective wire harness, as well as other conditions. A defective wire harness can result in an under voltage that is delivered to the electrical components of the fluid pump 10, such as the windings 20 for the stator 16. This information can be communicated to the vehicle 160 for immediate reporting or for reporting at a later time.

Referring again to FIGS. 1-6, the current sensor 42 described herein can be utilized for assessing the status of the fluid 14 being moved by the fluid pump 10. By way of example, and not limitation, where the current sensor 42 measures a drawn electrical current that is below values contained within the information table 80 stored within the fluid pump 10, this can be indicative of the motor 100 encountering less fluid resistance than expected. Where lower fluid resistance is experienced, this can be indicative of a low fluid level within a hydraulic fluid path 30, the fluid-delivery system 12 as a whole, or the fluid pump 10. This information regarding the level of the fluid 14 moving through the hydraulic fluid path 30 being below a normal operating level can be communicated with the vehicle 160 immediately such that the operator can address the issue, or take the vehicle 160 to a service location. This is particularly true in situations where the fluid 14 is automatic transmission fluid within a transmission, differential, or other similar component of a vehicle 160. Derivations between measurements taken by the current sensor 42 and the information tables 80 may also be indicative of other issues with the fluid pump 10, as described herein.

According to various aspects of the device, a run-time sensor 62 and a temperature sensor 44 can be used to monitor the run time and a micro temperature to determine a percentage of life of a fluid 14 that has been used or a percentage of life of the fluid 14 that is remaining. Typically, over time, the temperature monitored by a temperature sensor 44 will fluctuate as impurities and other debris 64 within the fluid 14 serves to modify the rate at which the fluid 14 temperature rises and reaches a threshold fluid temperature. Again, this is particularly true of automatic transmission fluid of the vehicle 160. These fluctuations in the rate of temperature increase or maximum temperature can be compared against stored information tables 80 to evaluate whether any deviations exist. Using the run-time sensor 62 and a temperature sensor 44, the percentage of used and remaining life of the fluid 14 can be monitored and communicated to the vehicle 160 for observation by the operator, or for later reporting.

Referring again to FIGS. 1-6, the fluid pump 10 can include a control algorithm 98 with the controller 32 that internally tracks the desired or command speed or command torque of the motor 100 within the fluid pump 10. The control algorithm 98 compares the command values with those of onboard information tables 80 containing known operating ranges that are utilized within the fluid pump 10 under normal or typical operating conditions. Where the command speed or command torque value, or target torque value, has deviated from known effective operating ranges included within the information table 80 for an extended or at least predetermined period of time, the controller 32 can indicate that calibration of the vehicle 160 or calibration of the fluid pump 10 is not mature or up to date. This information can then be communicated to the vehicle 160 for reporting. This reporting can be useful during manufacture, assembly, use, or other time frame when calibration or recalibration of the vehicle 160 occurs.

Referring again to FIGS. 1-6, the fluid pump 10 can include a valve body with a switching valve. The fluid pump 10 also includes an onboard control algorithm 98 that can internally track the fluid temperature, electrical current delivered to the windings 20 of the stator 16, speed of the rotor 22 and torque of the rotor 22. The controller 32 compares these values with comparable values that are stored within one or more onboard information tables 80 containing known effective operating ranges. These known effective operating ranges are compared with the monitored and recorded values to determine whether the drawn electrical current, speed of the rotor 22 or torque of the rotor 22 has deviated from the comparable values of the information table 80 by a predetermined amount and for an extended period of time or a predetermined period of time. If deviation occurs for at least the predetermined period of time or for an extended period of time, this can be indicative of a switching valve being stuck, inoperable or otherwise ineffectively operable. If recognized by the control algorithm 98, this information can be communicated to the vehicle 160 for later reporting.

Referring again to FIGS. 1-6, the fluid pump 10 can include an onboard control algorithm 98 that internally tracks a total length of time spent by the motor 100 of the fluid pump 10 in a run state at a given temperature of the fluid 14. This length of time spent by the motor 100 at a run state and the fluid temperature information are evaluated to derive a run-time/temperature value. This run-time/temperature value is compared to an onboard information table 80 of known acceptable run-time/temperature values based upon use of the fluid pump 10 over time. This comparison of the monitored run-time/temperature value against the acceptable run-time/temperature value can be utilized to measure the lifespan of the fluid 14 being moved by the fluid pump 10 as well as the used life and remaining life expectancy of the fluid 14 being moved by the fluid pump 10.

Referring again to FIGS. 1-6, the fluid pump 10 can include an onboard control algorithm 98 that actively monitors various operating conditions and internal fault conditions within the fluid pump 10. In certain conditions, these operating internal and internal fault conditions can combine in a certain prescribed manner that is indicative of an ineffective operating condition or fault state of the fluid pump 10. In this condition, the onboard control algorithm 98 can inform the vehicle 160 that the fluid pump 10 is incapable of self-correcting and may need to be replaced. This information can be communicated to the vehicle 160 for reporting. In addition, the fault conditions of the fluid pump 10 may be indicative of other faults of the vehicle 160 relating to the fluid pump 10 as well as the mechanism to which the fluid pump 10 delivers the operating fluid 14.

Referring again to FIGS. 1-6, the fluid pump 10 can include an onboard control algorithm 98 that samples key operating parameters of the fluid pump 10 at a rate that is multiple times faster than the communicated baud rate (typically in bits per second). The controller 32 typically measures, at a baud rate, the electrical current, the electrical voltage, the rotational speed of the rotor 22, fault indications and the temperature of the fluid pump 10 and the fluid 14 moving through the fluid pump 10. The control algorithm 98 increases this sampling speed performed by the controller 32 to an increased rate of sampling that can be from five times faster to 20 times faster or more relative to the baud rate. Typically, the onboard control algorithm 98 can sample the operating parameters at a rate ten times faster than the rate of communication of the baud rate. The information captured by the onboard control algorithm 98 during the repeated sampling of data is stored within an onboard memory 82 until a particular sample size is reached. This information is then communicated to the vehicle 160 automatically, or upon request, before the information is overwritten and the sampling process is repeated. This information can be rewritten every 24 hours such that every 24-hour period is a separate block of information for the fluid pump 10 information during that particular day. Other scales of information and time can be utilized with the onboard memory 82. In addition, where vehicles 160 experience more use, more frequent uploads of information can be conducted.

Referring again to FIGS. 1-6, the fluid pump 10 can include a contamination trap 130 within or near the fluid inlet to sequester, catch, or otherwise capture larger particles and debris 64 within a pump opening that can be in the form of a recessed cavity 132. This recessed cavity 132 serves to gravimetrically capture large debris 64 therein to prevent this large debris 64 from entering into the pump gears of the pump element 28. This large debris 64 can wear down the components of the pump element 28 as well as cause leaking between the individual pump chambers of the pump element 28. Various sensors 36 can be included within the recessed cavity 132 to determine when the recessed cavity 132 is nearing capacity with these larger particles such that the fluid pump 10 can be cleaned, replaced, or otherwise maintained. In addition, the recessed cavity 132 for capturing the larger particles of debris 64 can be used in combination with the various sensors 36 for determining the lifespan or clarity of the fluid 14 moving through the fluid pump 10. Used in combination, these two components, as well as other components described herein, can be used for determining the status of the fluid pump 10. This recessed cavity 132 can be positioned near an inlet or outlet of the fluid pump 10 or near the pump element 28 of the fluid pump 10.

Figure 6:
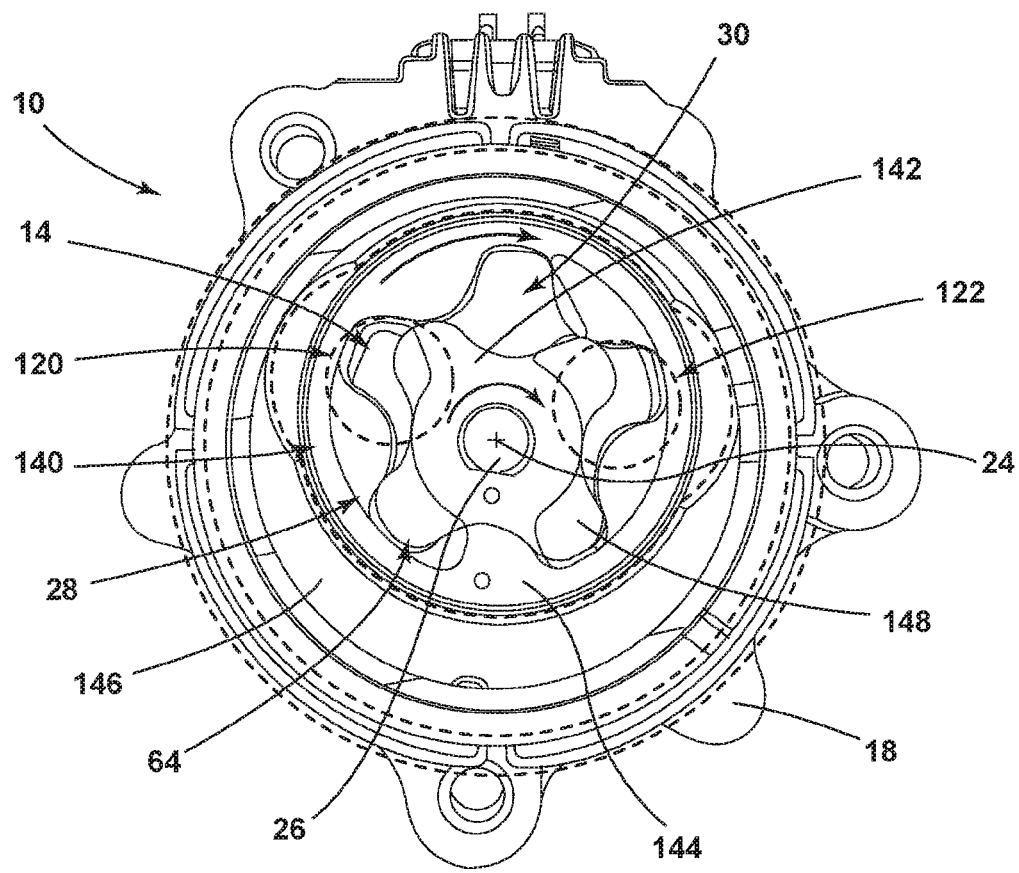
FIG. 6 is a cross-sectional view of an aspect of a fluid pump utilized within a fluid-delivery system.
Figure 7:
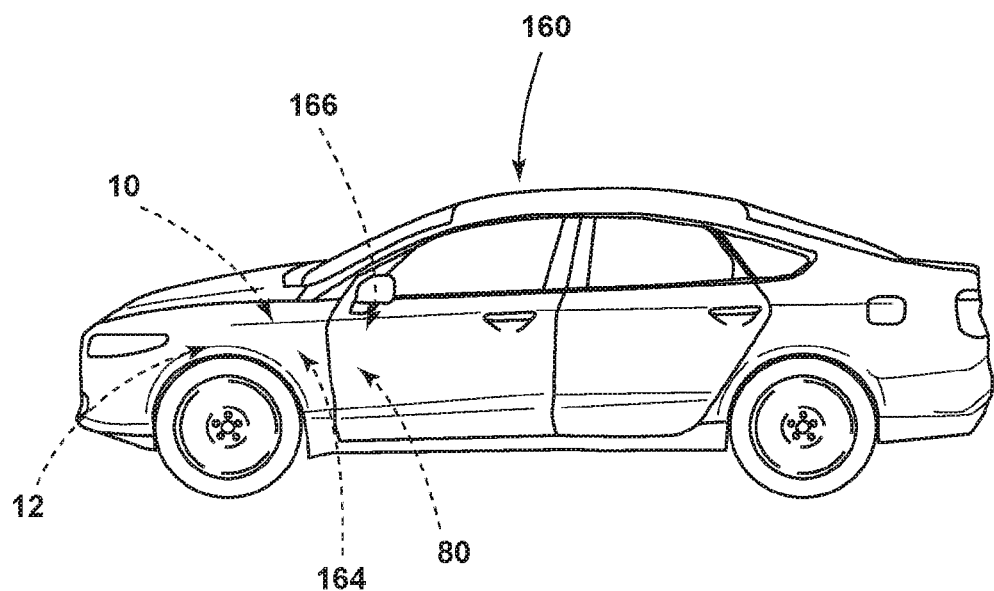
FIG. 7 is a schematic elevation view of a generic vehicle that incorporates an aspect of the fluid pump that is in communication with a fluid delivery system, an electrical system and a data system of the vehicle.
Figure 8:
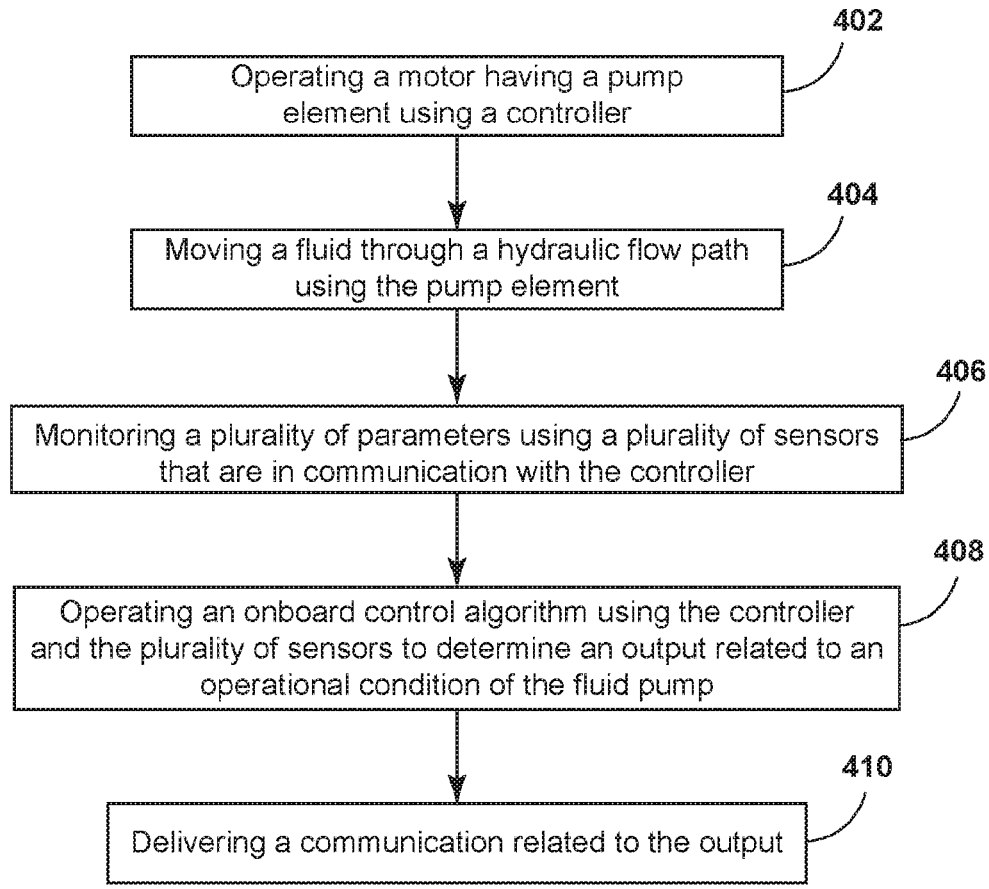
FIG. 8 is a schematic flow diagram illustrating a method for operating a fluid pump within a vehicle.

Referring to FIG. 6, the pump element 28 of the fluid pump 10 can be in the form of a generated rotor 140 having an internal gear 142 that is positioned to rotate with the drive shaft 26 about the rotational axis 24 of the drive shaft 26. An eccentric gear 144 is positioned around the internal gear 142, where this eccentric gear 144 is positioned to rotate about an offset axis within an eccentric ring 146 of the fluid pump 10. This offset axis, in combination with the internal gear 142 rotating about the rotational axis 24, produces various pump chambers that generate suction and pressure for moving fluid 14 through the generated rotor 140. In various aspects of the device, the generated rotor 140 can be a polymer-based pumping element. The polymer-based material 148 of the pump element 28 can be used to cause various debris 64 within the fluid 14, such as metallic debris, to be embedded within the polymer-material of the generated rotor 140. As the cogs and gears of the generated rotor 140 mesh and debris 64 moves through the generated rotor 140, debris 64 embeds within the polymer material to prevent this material from moving through the remainder of the hydraulic flow system of the fluid pump 10. At locations where the internal gear 142 engages the eccentric gear 144, a piece of debris 64 may cause an operating shock event or jam within the pump element 28. Where the polymer-based material 148 is used, the piece of debris 64 can be pushed into or otherwise embedded within the polymer-based material 148. Over time, it may become necessary for the pump element 28 to be replaced. Upon replacement, the embedded debris 64 is also removed from the fluid pump 10. It is also contemplated that the pump element 28 can be a metallic member having a polymer-based material 148 surrounding metallic components as a coating. This polymer-based material 148 can be used to cause the debris 64 to embed therein for preventing this material from flowing through the hydraulic flow system of the fluid pump 10. By capturing these particles, these larger particles can be absorbed or embedded within the components of the pump element 28 so that the components or gears of the pump element 28 do not bind or wear down prematurely.

Referring again to FIGS. 1-6, the fluid pump 10 can include an onboard control algorithm 98 that measures a fluid temperature, such as from a vehicle bus of the electrical system 164 of the vehicle 160, as well as voltage, estimated speed, electrical current from an integrated pump controller 32, and other similar data points. These data points are provided as inputs and are provided to generate an estimated volumetric efficiency as an output of the fluid pump 10. This efficiency is then communicated back to the vehicle 160 as a percentage efficiency during operation. The fluid temperature, voltage, estimated speed and electrical current are used as input information to compare against various output data points. These input and output data points are compared to generate the volumetric efficiency of the fluid pump 10 during operation. These data points can then be communicated to the controller 32 and/or the vehicle 160 for later reporting.

Referring again to FIGS. 1-6, the fluid pump 10 can include an onboard control algorithm 98 that captures and records various inputs in the form of fluid temperature from a vehicle bus of the electrical system 164 of the vehicle 160, voltage, estimated speed, a motor torque/current constant (Kt) and electrical current from an integrated controller 32. These data points are provided as inputs and are used to estimate overall efficiency as an output of the fluid pump 10. This can be calculated through various mathematical operations. One such operation can include, but is not limited to:

$$\frac{(\text{estimated outlet pressure} \times \text{estimated fluid flow})}{(\text{input voltage} \times \text{input current})}$$

This resulting calculation can then be communicated back to the controller 32 and/or the vehicle 160 as a percentage efficiency during operation of the fluid pump 10. This calculation is used to determine whether the voltage and electrical current is being input into the fluid pump 10 resulting in the desired operational efficiency for the fluid pump 10. These measurements are reflected through the data points by the various sensors 36 in the form of temperature, voltage, estimated rotational speed of the rotor 22 and/or the pump element 28, a motor constant and electrical current.

Referring again to FIGS. 1-6, the fluid pump 10 can include an onboard control algorithm 98 that uses various sensors 36 to capture fluid temperature, such as from a vehicle bus of the electrical system 164 of the vehicle 160, voltage, estimated speed, a motor torque/current constant (Kt) and an electrical current from a controller 32 of the fluid pump 10. These data points are provided as inputs to estimate a time lapsed to achieve the target fluid temperature. If the time to achieve a target temperature is too low, this can be indicative of an undercurrent that can be symptomatic of a particular issue within the fluid pump 10. If the target temperature is achieved too quickly, this can be indicative of an overcurrent that may be indicative of separate problems of a fluid pump 10. Deviations of these data points from the target temperature can be communicated to the controller 32 and/or the vehicle 160 for later reporting.

Referring again to FIGS. 1-6, the fluid pump 10 can include an onboard control algorithm 98 that measures fluid temperature, such as from a vehicle bus, voltage, the motor torque/current constant (Kt) and an electrical current from an integrated controller 32. These data points are inputs that are provided to estimate a pressure, in the form of torque of the motor 100, as an output. This enables the fluid pump 10 to receive an outlet pressure target that may be desired at any time during operation of the fluid pump 10. The fluid pump 10 can then operate to minimize an error or deviation between the estimated and command pressure or torque within the motor 100. Deviations between the estimated and command pressure can be communicated to the controller 32 and/or the vehicle 160 for later reporting. These deviations in pressure can be indicative of larger problems within the fluid pump 10. A lower pressure of the fluid 14 can be indicative of a low level of fluid 14 or blockages at the inlet of the fluid pump 10 that may result in a starving condition of the fluid pump 10. Conversely, an overpressure within the fluid pump 10 can be indicative of an excess of fluid 14 within the fluid pump 10 that may be caused by a blockage in the outlet side 122 of the fluid pump 10.

Referring again to FIGS. 1-6, the fluid pump 10 can include an onboard control algorithm 98 that captures a fluid temperature, such as from a vehicle bus of the electrical system 164 of the vehicle 160, voltage, actual speed of the rotor 22, pump element 28 or fluid 14, and electrical current from the integrated controller 32 for the fluid pump 10. These data points can be used as inputs and are provided to generate an estimated volumetric flow or speed of the fluid 14 as an output. This enables the fluid pump 10 to receive a target volumetric flow, or outlet flow target, such that a certain amount of fluid 14 is required to be moved by the fluid pump 10 from the inlet to the outlet. The fluid pump 10 can then operate to minimize error or deviation between the estimated volumetric fluid flow and the desired or target volumetric fluid flow. Deviations between these estimated and target volumetric fluid flows can be communicated to the controller 32 and/or the vehicle 160 for later reporting.

The various aspects of the device described herein can be used to trouble shoot, diagnose, maintain, or otherwise monitor the status of the fluid pump 10, the fluid 14 moving therethrough and the larger mechanical assembly that is served by the fluid pump 10. It should be understood that these solutions described herein can be used in combination to provide various diagnosing functions related to the fluid pump 10. In certain aspects of the device, a reading measured by one of the sensors 36 may be indicative of several possible conditions present within the fluid pump 10. Using a combination of sensors 36, mechanisms and control algorithms 98, layers of information can be analyzed and compared to rule out certain conditions, that may have similar symptomatic presentations, and diagnose a small set of possible conditions, or one possible condition, that may be actually present within the fluid pump 10.

As described herein, the various reporting functions of the sensors 36 included within or around the fluid pump 10 can be reported to a memory 82 stored within the fluid pump 10, can be communicated to the vehicle 160 for later reporting, can be communicated to the vehicle 160 for immediate reporting such as to an operator, or can be periodically recorded, delivered, and then overwritten after certain reporting benchmarks are achieved. The various reporting functions described herein can be accomplished through a heads-up display of the vehicle 160, various warning signals included within the vehicle 160, communicated during maintenance of the vehicle 160, combinations thereof, and other similar reporting timeframes. Whether an issue is reported immediately to the user or stored for later reporting, or both, can depend on the severity of the condition. Where a certain condition may affect the health of the larger mechanical assembly, or the vehicle 160 in general, the issue may typically be communicated immediately to the user so that it can be addressed. Where a problem may relate to an efficiency issue or the age of the fluid pump 10, this information may be stored to be communicated and addressed during a subsequent service visit.

Referring now to FIGS. 1-24, having described various aspects of the device, a series of methods and subroutines are disclosed for operating a fluid pump 10 that is disposed within a vehicle 160 or other electromechanical assembly. The disclosed subroutines can be used for operating an onboard control algorithm 98 that is incorporated within a controller 32 for the fluid pump 10. Typically, this onboard control algorithm 98 is utilized for producing a particular output that can be stored within the controller 32, transmitted to an external memory, or delivered to an external location either automatically or upon request.

Referring to FIGS. 1-8, the method 400 includes operating the fluid pump 10 within the vehicle 160, wherein the vehicle 160 includes the fluid-delivery system 12, the electrical system 164 and the data and communications system 166 that are each in communication with the fluid pump 10. The method 400 includes a step 402 of operating the motor 100 using the controller 32. As the motor 100 is operated, fluid 14 is moved through the hydraulic fluid path 30 according to the operation of the pump element (step 404). The plurality of parameters are monitored using the plurality of sensors 36 that are incorporated within or placed in communication with the controller 32 for the fluid pump 10 (step 406). As described herein, the plurality of parameters are related to at least one of the controller 32, the motor 100, the fluid 14 and the hydraulic fluid path 30 for the fluid pump 10. The onboard control algorithm 98 is operated utilizing the controller 32 that cooperates with one or more of the plurality of sensors 36 of the fluid pump 10 to determine an output related to an operational condition of the fluid pump 10 (step 408). When the output is generated, a communication is delivered, where the communication is related to the output (step 410). This output is delivered to one of an internal memory incorporated within the controller 32, an external memory either within the vehicle 160 or external to the vehicle 160, or to an external controller 32 that is within the vehicle 160 or external to the vehicle 160. As described herein, this output can be delivered upon a specific request by a user or service technician operating on the vehicle 160. In addition, the output can be delivered automatically during operation of the motor 100 and the controller 32. In such an aspect of the device, the output can be delivered in real time as the output is generated, or can be delivered after a certain number of outputs have been accumulated.

Referring now to FIGS. 9-24, the onboard control algorithm 98 that is incorporated within the controller 32 performs one or more subroutines and operates utilizing various measurements and data provided by one or more of the plurality of sensors 36. This information can be combined with information that is obtained through information tables 80, or information from the vehicle 160 that is related to the fluid-delivery system 12, the electrical system 164, and/or the data and communications system 166. Utilizing this information, the onboard control algorithm 98 analyzes and evaluates the various information to arrive at the output that is related to the operational condition of the fluid pump 10. While exemplary subroutines are described and disclosed herein, it is contemplated that these subroutines of the onboard control algorithms 98 can be operated simultaneously, contemporaneously, sequentially, independently, collectively or in other various combinations and permutations. It is also contemplated that additional aspects of the subroutines of the onboard control algorithm 98 are contemplated, they utilize the various sensors 36 of the plurality of sensors 36 described herein.

Figure 9:
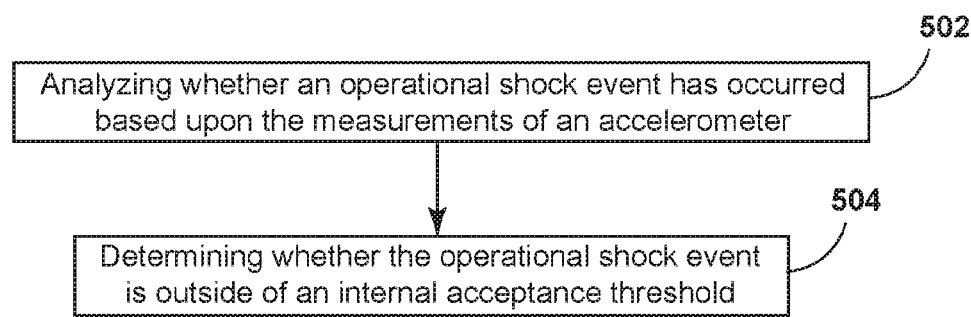
FIG. 9 is a schematic flow diagram illustrating a method for operating an onboard control algorithm within a controller of the fluid pump to determine operational output.

As exemplified in FIG. 9, a subroutine 500 is utilized for generating an output related to the operational condition of the fluid pump 10 in the form of a rotational operation of the rotor as measured using an accelerometer 38 of the plurality of sensors 36. According to the subroutine 500, the output is determined by analyzing whether an operational shock event has occurred based upon the measurements of the accelerometer 38 (step 502). After this analysis is complete, the onboard control algorithm 98 determines whether the operational shock event is outside of an internal acceptance threshold (step 504). Where outside of the internal acceptance threshold, the operational shock event is time-stamped and recorded for recording in real time or upon a later request.

Figure 10:
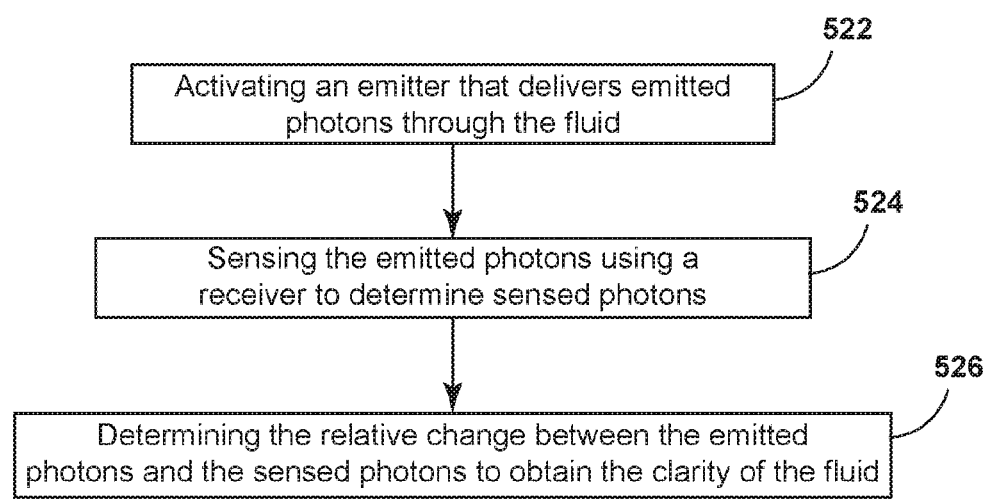
FIG. 10 is a schematic flow diagram illustrating a method for operating an onboard control algorithm within a controller of the fluid pump to determine operational output.

Referring now to FIG. 10, a subroutine 520 of the operational control algorithm 98 generates the output in relation to a clarity of the fluid 14 moving through the hydraulic fluid path 30. According to the subroutine 520, the clarity is determined by activating an emitter that delivers emitted photons through the fluid 14 (step 522). The emitted photons are sensed using a receiver to determine the sensed photons (step 524). The onboard control algorithm 98 then determines the relative change between the emitted photons and the sensed photons to obtain the clarity of the fluid 14 (step 526). As described herein, this output in the form of clarity can be used for determining the percentage of life remaining of the fluid 14 moving through the hydraulic fluid path 30.

Figure 11:
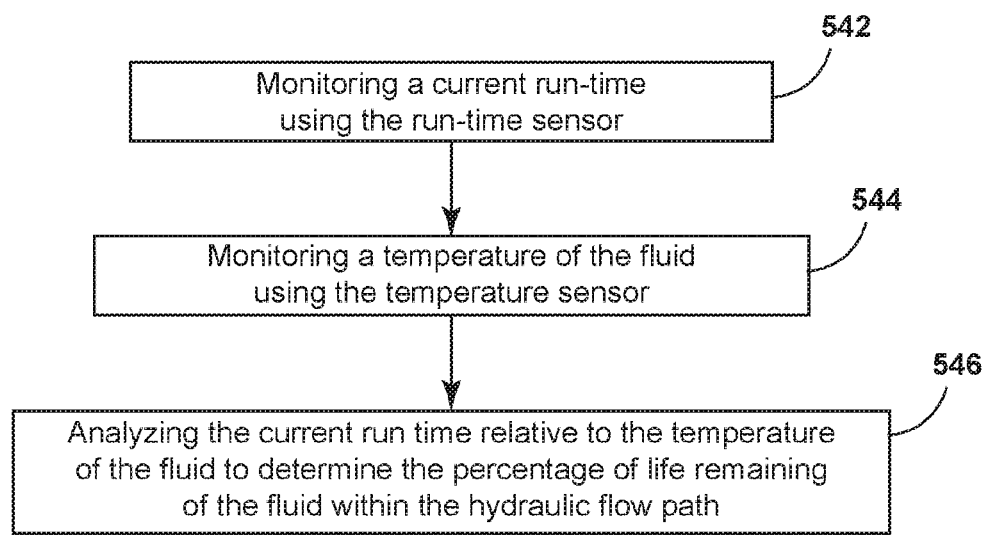
FIG. 11 is a schematic flow diagram illustrating a method for operating an onboard control algorithm within a controller of the fluid pump to determine operational output.

Referring now to FIG. 11, a subroutine 540 utilizes the onboard control algorithm 98 to generate an output related to a percentage of life remaining of the fluid 14 within the hydraulic fluid path 30. According to the subroutine 540, the onboard control algorithm 98 monitors a current run time using the run-time sensor 62 (step 542). The temperature of the fluid 14 is monitored using the temperature sensor (step 544). The current run time relative to the temperature of the fluid 14 is then analyzed to determine the percentage of life remaining of the fluid 14 within the hydraulic fluid path 30 (step 546). As described herein, the current run time relative to the temperature of the fluid 14 can be analyzed against various information tables 80 and values contained therein to arrive at the percentage of life remaining of the fluid 14.

Figure 12:
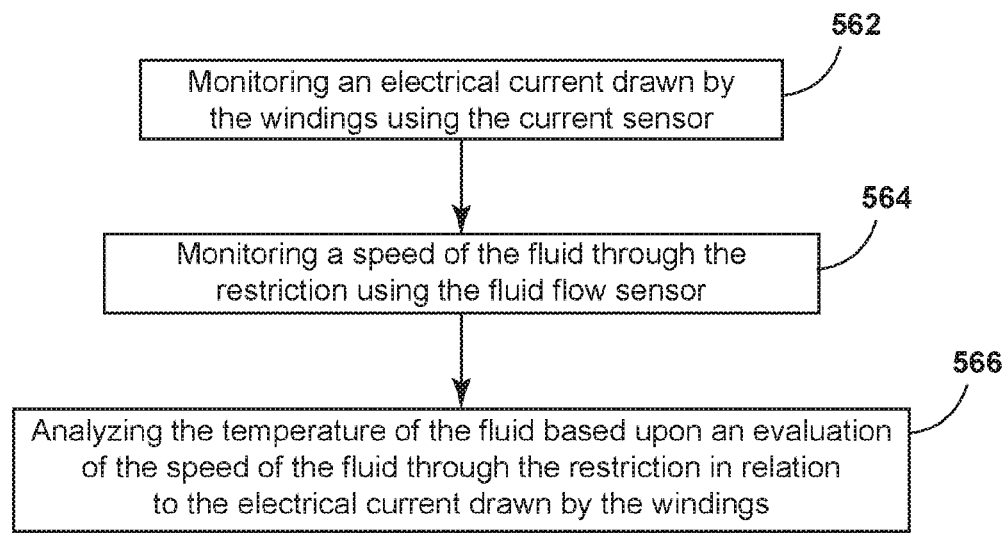
FIG. 12 is a schematic flow diagram illustrating a method for operating an onboard control algorithm within a controller of the fluid pump to determine operational output.

Referring now to FIG. 12, a subroutine 560 is disclosed where the onboard control algorithm 98 generates an output related to a temperature of the fluid 14 moving through a restriction 84 in the hydraulic fluid path 30. According to the subroutine 560, an electrical current drawn by the windings 20 is monitored using a current sensor (step 562). The speed or flow rate of the fluid 14 moving through the restriction 84 is monitored using a fluid flow sensor (step 564). The temperature of the fluid 14 based upon an evaluation of flow rate of the fluid 14 through the restriction 84 is analyzed in relation to the electrical current drawn by the windings 20 (step 566). The electrical current drawn by the windings 20 analyzed in relation to the flow rate of fluid 14 through the restriction 84 is indicative of a temperature of the fluid 14 within the hydraulic fluid path 30.

Figure 13:
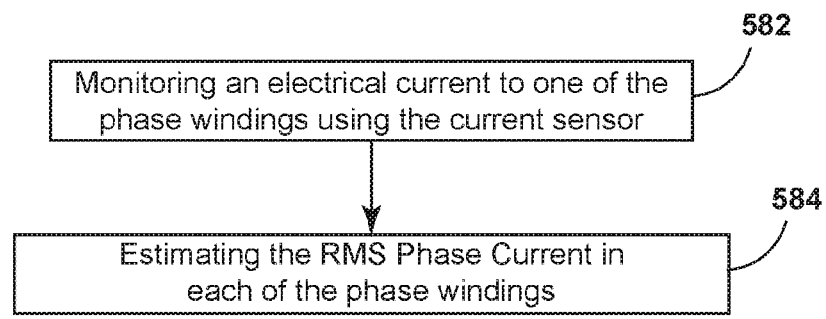
FIG. 13 is a schematic flow diagram illustrating a method for operating an onboard control algorithm within a controller of the fluid pump to determine operational output.

Referring now to FIG. 13, a subroutine 580 is disclosed where the output is related to an estimate of RMS phase current for each phase winding of the windings 20 of the stator 16. According to the subroutine 580, the electrical current to one of the phase windings 20 is monitored using a current sensor (step 582). Utilizing this electrical current drawn by one of the phase windings 20, the RMS phase current for all three of the phase windings 20 can be estimated to determine the estimated RMS phase current in each of the phase windings 20 (step 584).

Figure 14:
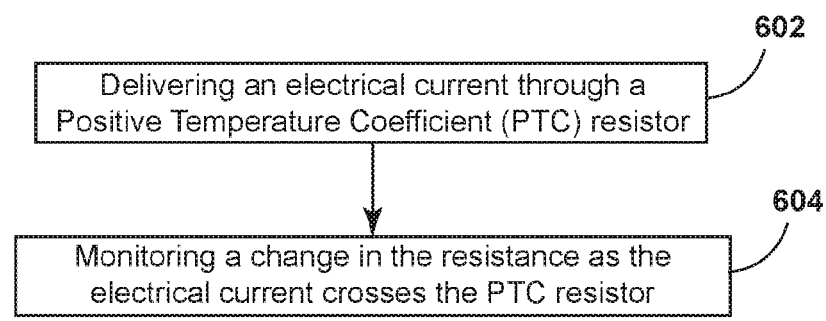
FIG. 14 is a schematic flow diagram illustrating a method for operating an onboard control algorithm within a controller of the fluid pump to determine operational output.

Referring now to FIG. 14, a subroutine 600 is disclosed where the output is related to a bridge temperature of the windings 20. According to the subroutine 600, an electrical current is delivered through a PTC resistor (step 602). A change in the resistance is monitored as the electrical current crosses the PTC resistor over time (step 604). This change in resistance is indicative of a bridge temperature of the windings 20 during operation of the fluid pump 10.

Figure 15:
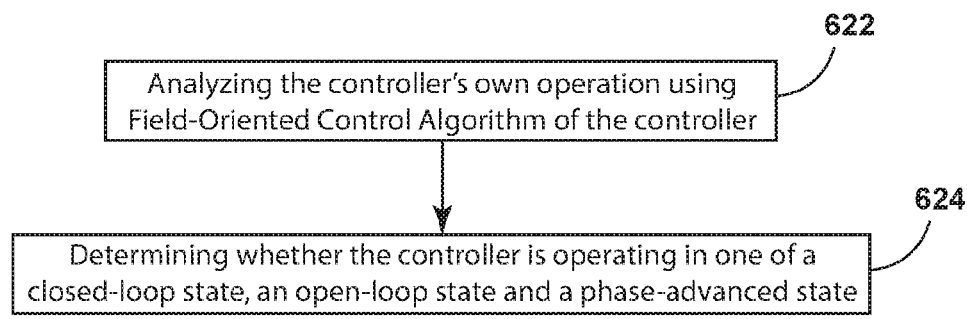
FIG. 15 is a schematic flow diagram illustrating a method for operating an onboard control algorithm within a controller of the fluid pump to determine operational output.

Referring now to FIG. 15, a subroutine 620 generates an output related to a diagnostic of the controller 32. According to the subroutine 620, the controller 32 conducts an analysis of its own operation using a field-oriented control algorithm 98 (step 622). Based upon this analysis, the controller 32, being a self-monitoring controller, determines if it is operating in one of a closed-loop state, an open-loop state or a phase-advanced state (step 624). Various modifications and alterations can be made within the controller 32 based upon use of the field-oriented control algorithm 98.

According to the various aspects of the device, and as described herein, the onboard control algorithm 98 can incorporate or can utilize various values obtained from one or more information tables 80. Typically, these information tables 80 are indicative of a normal operation of the fluid pump 10. When the values obtained by the onboard control algorithm 98 are above or below these normal operating values, this can be indicative of an issue such that an output is generated for the controller 32 to communicate to a memory 82 or to an external source.

Figure 16:
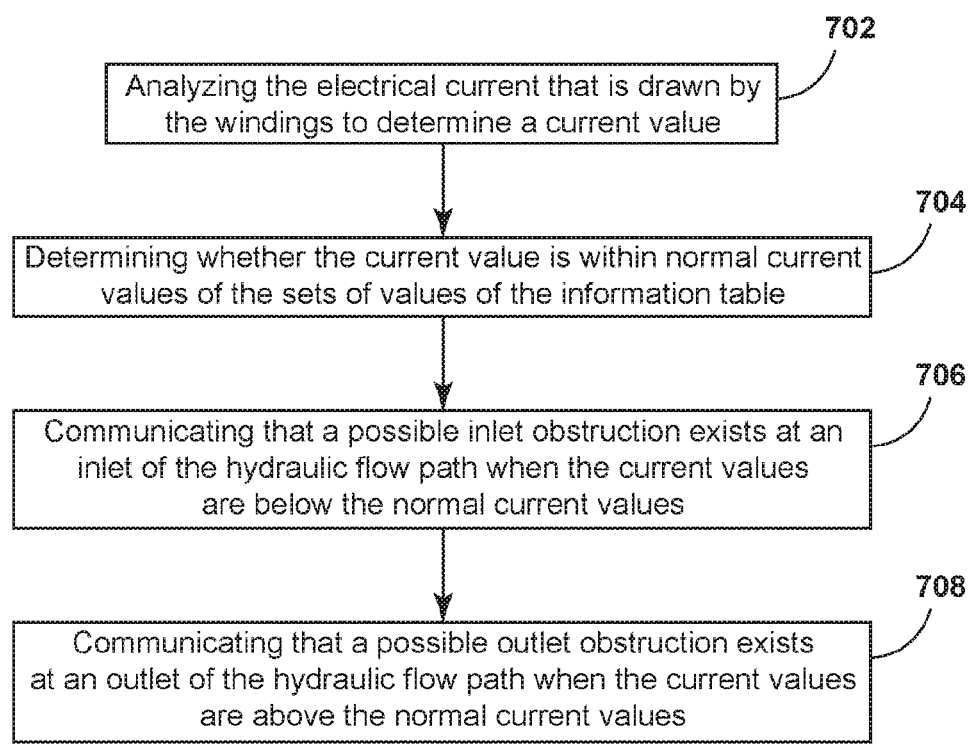
FIG. 16 is a schematic flow diagram illustrating a method for operating an onboard control algorithm within a controller of the fluid pump to determine operational output.

Referring now to FIG. 16, a subroutine 700 is disclosed where the output is related to a condition of the hydraulic fluid path 30. According to the subroutine 700, the electrical current drawn by the windings 20 is analyzed using a current sensor 42 to determine an electrical current value (step 702). The electrical current value is then analyzed to determine whether they are within normal electrical current values of corresponding values contained within the information table 80 (step 704). According to the subroutine 700, a step 706 can include communicating that a possible inlet obstruction exists at an inlet of the hydraulic fluid path 30 when the current values are below the normal current values. A step 708 of the subroutine 700 includes communicating that a possible outlet obstruction exists at an outlet of the hydraulic fluid path 30 when the current values are above the normal current values.

Figure 17:
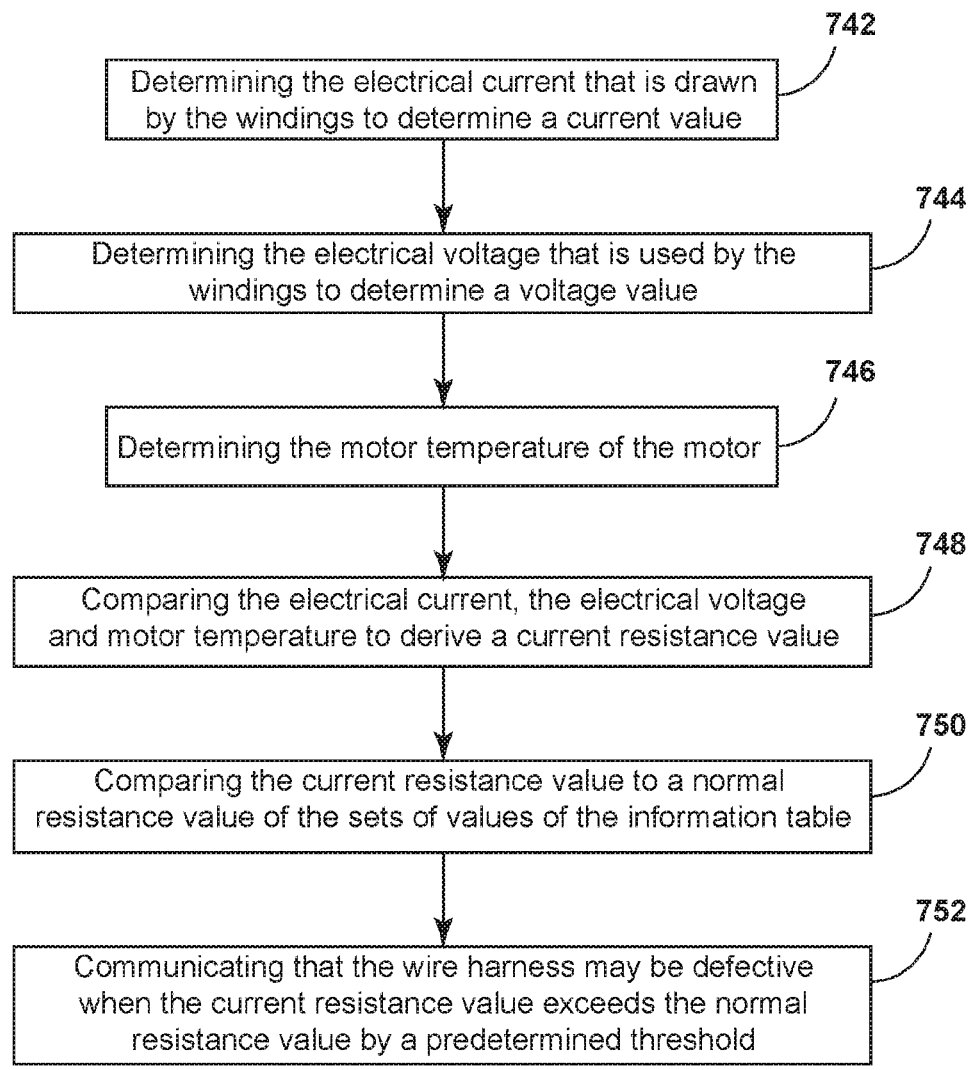
FIG. 17 is a schematic flow diagram illustrating a method for operating an onboard control algorithm within a controller of the fluid pump to determine operational output.

Referring now to FIG. 17, a subroutine 740 is utilized to generate an output related to the condition of a wire harness for the motor 100 of the fluid pump 10. According to the subroutine 740, the electrical current drawn by the winding is analyzed to determine an electrical current value (step 742). The electrical voltage that is used by the windings 20 is also analyzed to determine a voltage value (step 744). A motor temperature of the motor 100 is determined (step 746). The electrical current, the electrical voltage and the motor temperature are compared to derive a current resistance value (step 748). The current resistance value is compared to a normal resistance value that is included within the sets of values of the information table 80 (step 750). A step 752 includes communicating that the wire harness may be defective when the current resistance value exceeds the normal resistance value by a predetermined threshold.

Figure 18:
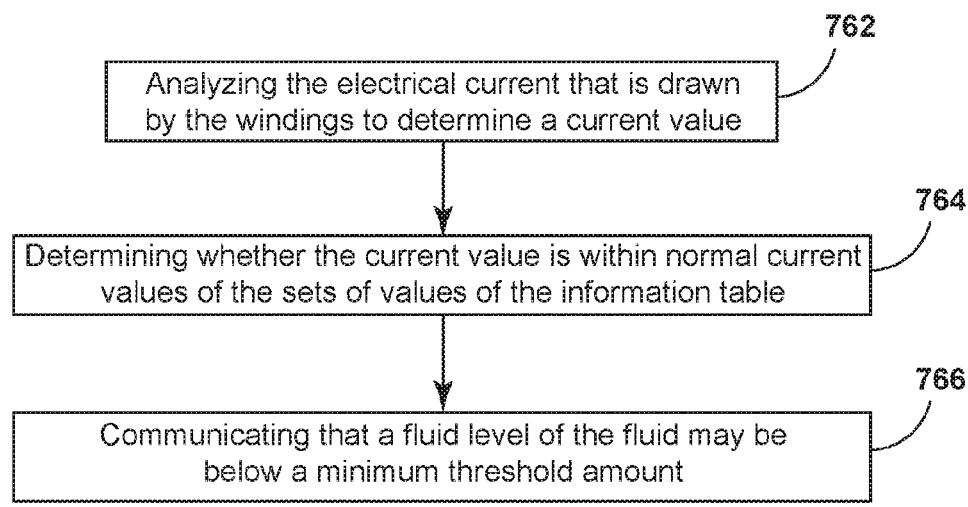
FIG. 18 is a schematic flow diagram illustrating a method for operating an onboard control algorithm within a controller of the fluid pump to determine operational output.

Referring now to FIG. 18, a subroutine 760 is used to generate an output related to a level of fluid 14 within the hydraulic fluid path 30 and the fluid-delivery system 12 of the vehicle 160. According to the subroutine 760, the electrical current that is drawn by the windings 20 is analyzed to determine an electrical current value (step 762). The controller 32 then determines whether the current value is within a normal current value of the sets of values within the information table 80 (step 764). The subroutine 760 also includes a step 766 that includes communicating that a level of the fluid 14 within the fluid-delivery system 12 may be below a minimum threshold amount when the electrical current value is outside of the normal current values.

Figure 19:
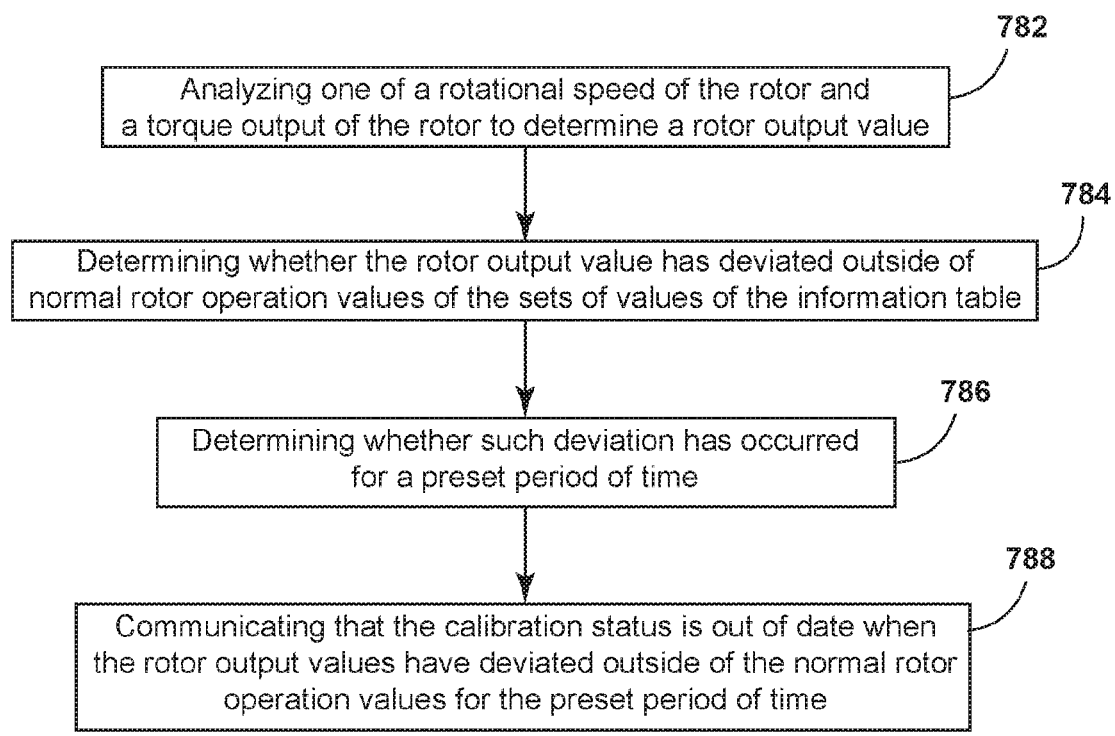
FIG. 19 is a schematic flow diagram illustrating a method for operating an onboard control algorithm within a controller of the fluid pump to determine operational output.

Referring now to FIG. 19, a subroutine 780 is used to generate an output that is related to a calibration status of the fluid pump 10. According to the subroutine 780, one of a rotational speed of the rotor and a torque output of the rotor are analyzed to determine a rotor output value (step 782). The controller 32 then determines whether the rotor output value has deviated outside of a normal rotor operation value of the sets of values of the information table 80 (step 784). The controller 32 then determines whether such deviation has occurred for a preset period of time (step 786). The controller 32 then communicates that the calibration status is out of date when the rotor output values have deviated outside of the normal rotor operation values for the preset period of time (step 788).

Figure 20:
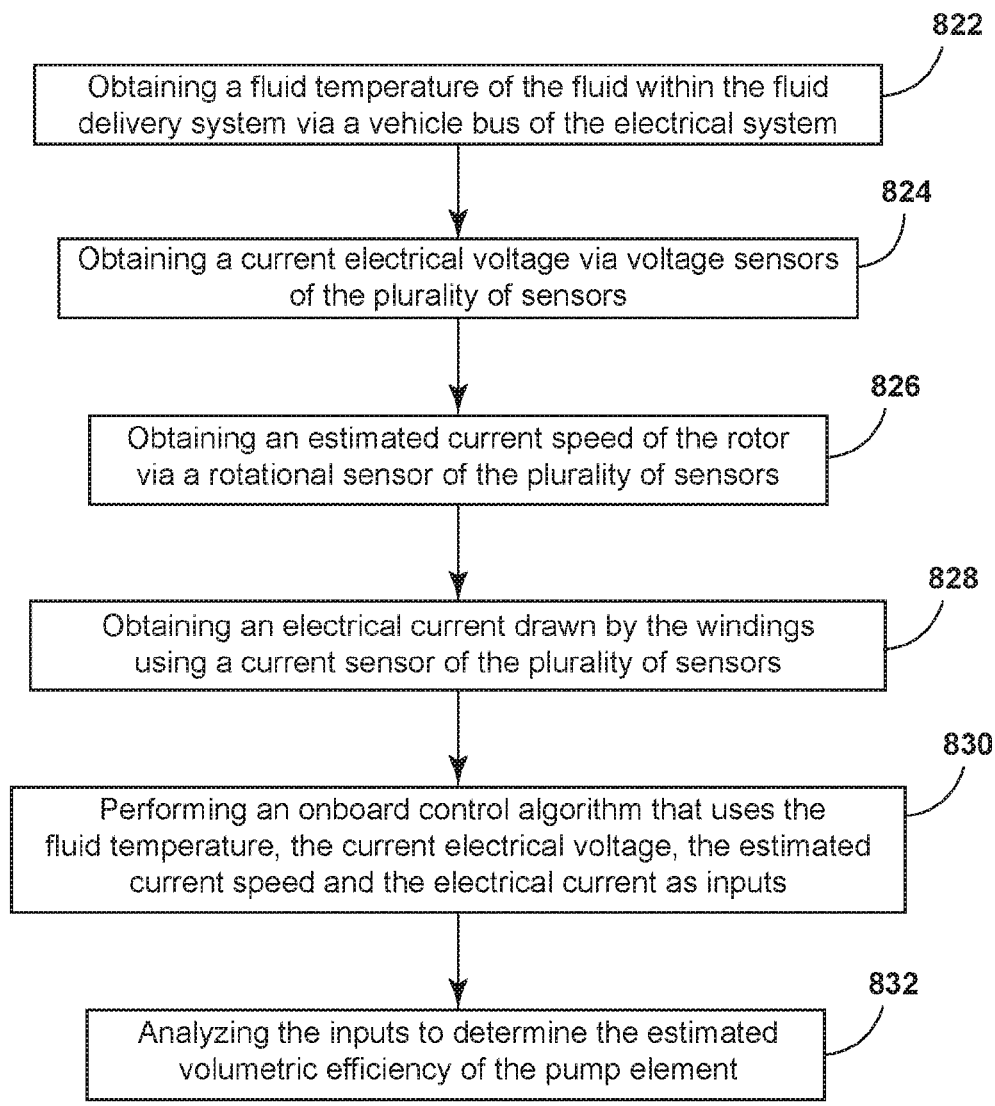
FIG. 20 is a schematic flow diagram illustrating a method for operating an onboard control algorithm within a controller of the fluid pump to determine operational output.

Referring now to FIG. 20, a subroutine 820 generates an output related to an estimated volumetric efficiency of the pump element 28 of the fluid pump 10. According to the subroutine 820, the controller 32 obtains a fluid temperature of the fluid 14 within the fluid-delivery system 12 via a vehicle bus of the electrical system 164 for the vehicle 160 (step 822). The controller 32 then obtains a current electrical voltage used within the windings 20 of the motor 100 via voltage sensors of the plurality of sensors 36 (step 824). The controller 32 also obtains an estimated current rotational speed of the rotor via a rotational sensor of the plurality of sensors 36 (step 826). The controller 32 also obtains an electrical current drawn by the windings 20 using a current sensor of the plurality of sensors 36 (step 828). The controller 32 combines the fluid temperature, the current electrical voltage, the estimated current rotational speed and the electrical current as inputs that are utilized by the onboard control algorithm 98 (step 830). The onboard control algorithm 98 analyzes the inputs to determine the estimated volumetric efficiency of the pump element 28 for the fluid pump 10 (step 832).

Figure 21:
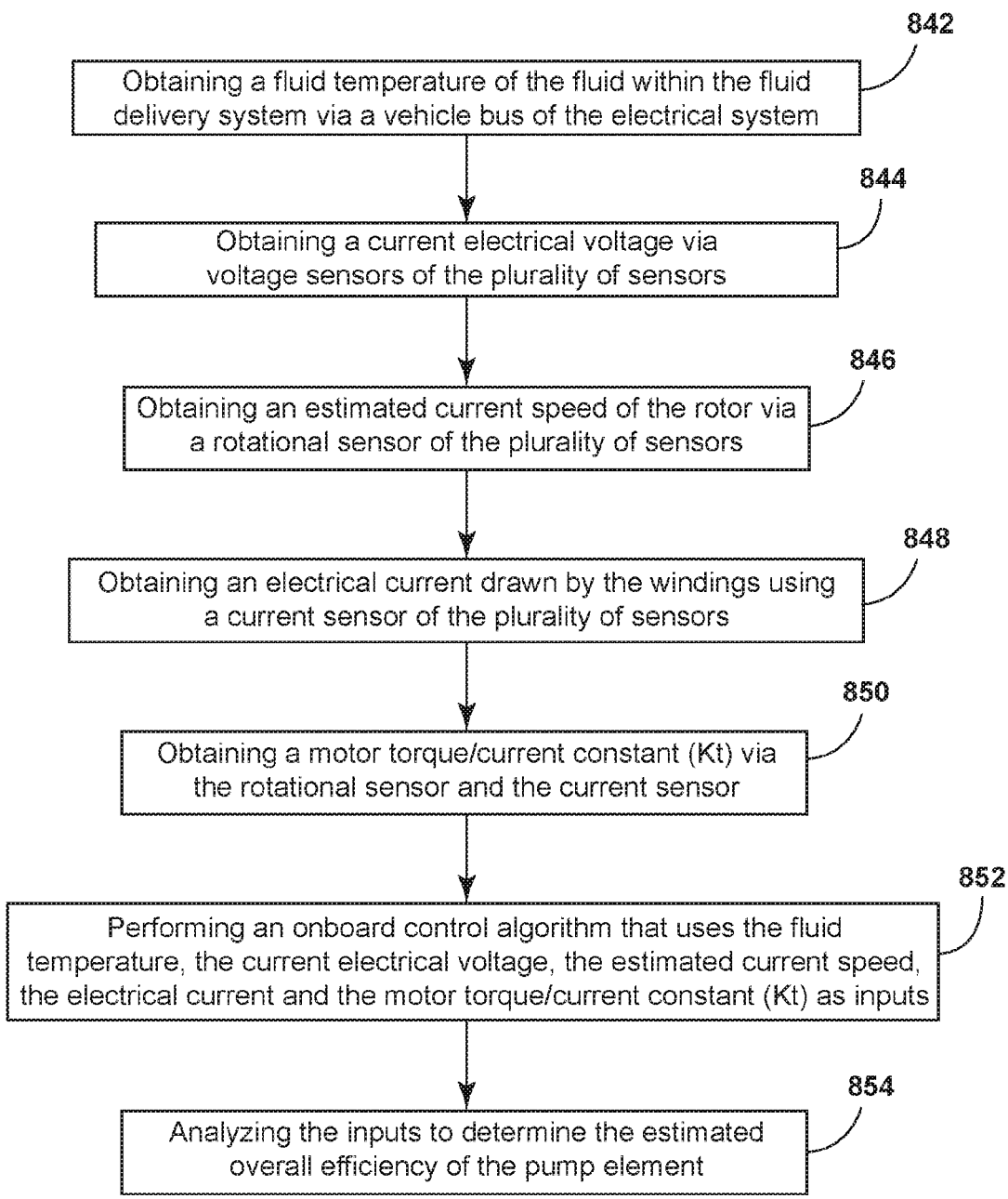
FIG. 21 is a schematic flow diagram illustrating a method for operating an onboard control algorithm within a controller of the fluid pump to determine operational output.

Referring now to FIG. 21, a subroutine 840 generates an output related to an estimated overall efficiency of the pump element 28. According to the subroutine 840, the controller 32 obtains a fluid temperature of the fluid 14 within the fluid-delivery system 12 via a vehicle bus of the electrical system 164 for the vehicle 160 (step 842). The controller 32 also obtains a current electrical voltage via voltage sensors of the plurality of sensors 36 (step 844). The controller 32 obtains an estimated current rotational speed of the rotor via a rotational sensor of the plurality of sensors 36 (step 846). The controller 32 also obtains an electrical current drawn by the windings 20 using a current sensor of the plurality of sensors 36 (step 848). The controller 32 then obtains a motor torque/current constant (Kt) via the rotational sensor and the current sensor (step 850). According to a step 852 of subroutine 840, the controller 32 forms the onboard control algorithm 98 and uses the fluid temperature, the current electrical voltage, the estimated current rotational speed, the electrical current and the motor torque/current constant as inputs to be evaluated by the algorithm. The controller 32 then analyzes these inputs to determine the estimated overall efficiency of the pump element (step 854).

Figure 22:
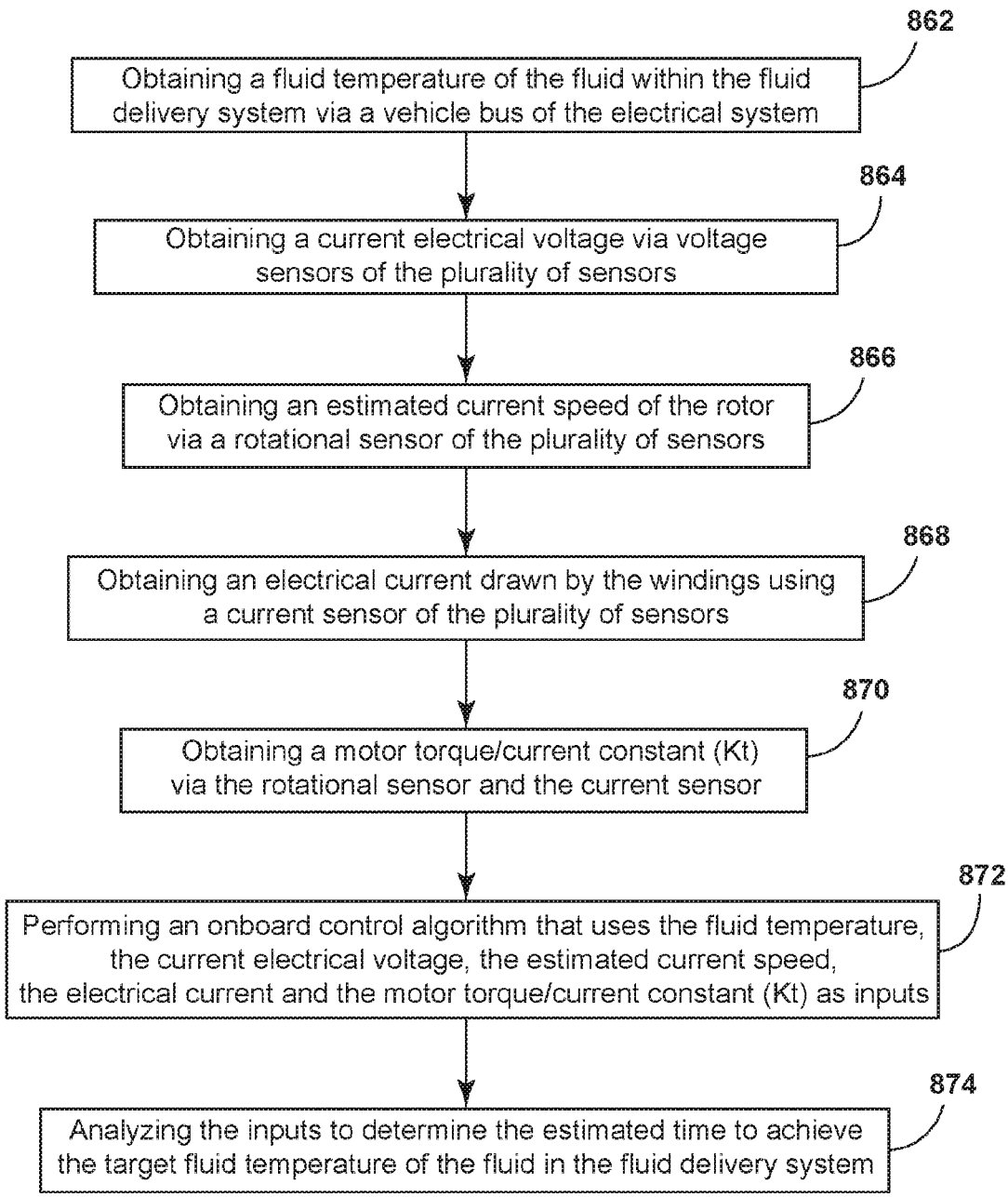
FIG. 22 is a schematic flow diagram illustrating a method for operating an onboard control algorithm within a controller of the fluid pump to determine operational output.

Referring now to FIG. 22, a subroutine 860 generates an output related to an estimated time to achieve a target fluid temperature of the fluid 14 and fluid-delivery system 12. According to the subroutine 860, the controller 32 obtains a fluid temperature of the fluid 14 within the fluid-delivery system 12 via a vehicle bus of the electrical system 164 for the vehicle 160 (step 862). The controller 32 also obtains a current electrical voltage via voltage sensors (step 864). An estimated current rotational speed of the rotor is also obtained (step 866). An electrical current drawn by the windings 20 is obtained using a current sensor of the plurality of sensors 36 (step 868). A motor torque/current constant (Kt) is obtained via the rotational sensor and the current sensor (step 870). The onboard control algorithm 98 utilizes these obtained values as inputs (step 872). The controller 32 then analyzes these inputs to determine the estimated time to achieve the target fluid temperature of the fluid 14 in the fluid-delivery system 12 (step 874).

Figure 23:
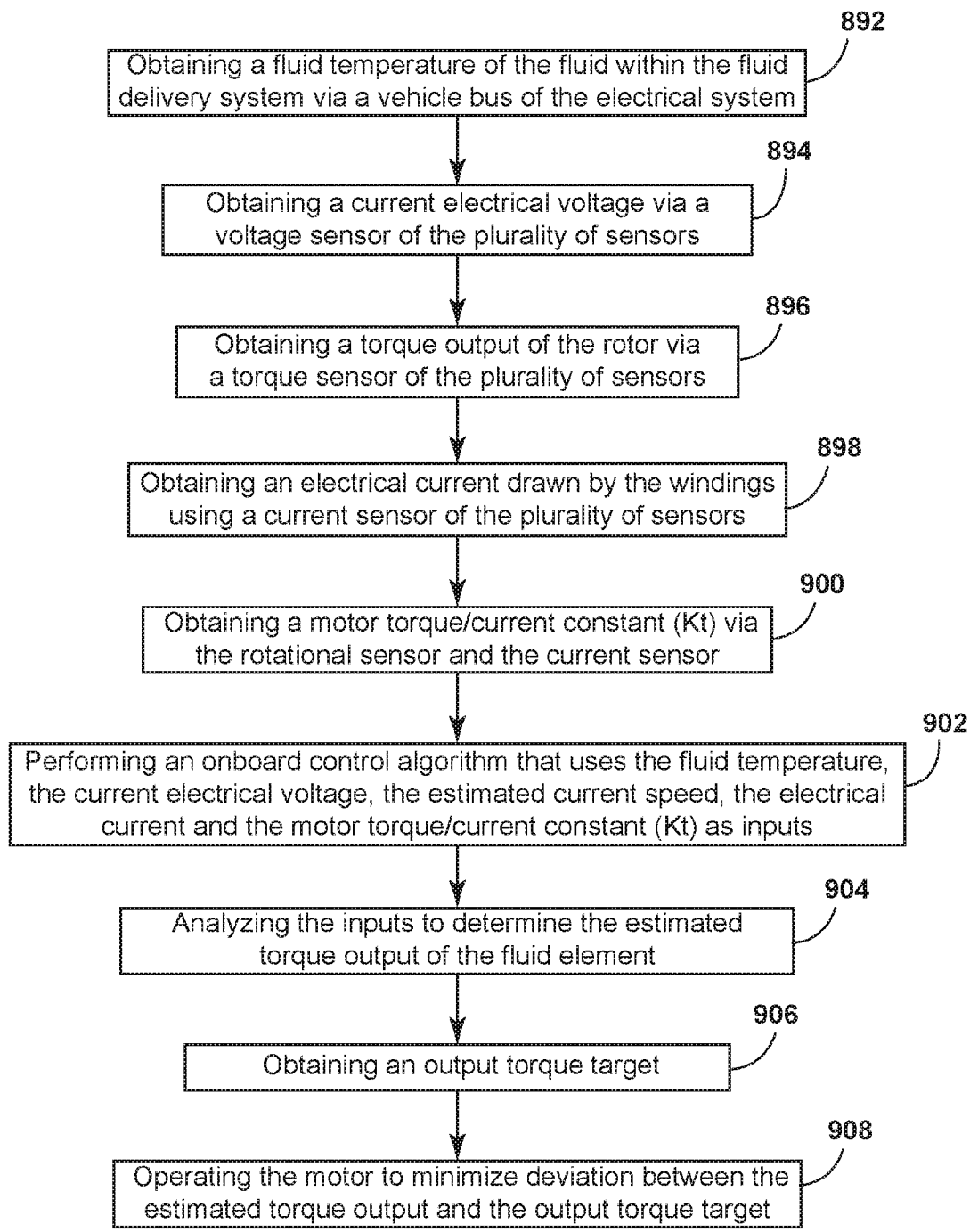
FIG. 23 is a schematic flow diagram illustrating a method for operating an onboard control algorithm within a controller of the fluid pump to determine operational output.

Referring now to FIG. 23, a subroutine 890 is utilized for obtaining output related to an estimated torque output of the pump element 28. According to the subroutine 890, the controller 32 obtains a fluid temperature of the fluid 14 within the fluid-delivery system 12 via a vehicle bus of the electrical system 164 for the vehicle 160 (step 892). The controller 32 also obtains a current electrical voltage of the motor 100 (step 894), obtains a torque output of the rotor (step 896), obtains an electrical current drawn by the windings 20 (step 898) and obtains a motor torque/current constant (Kt) (step 900). The controller 32 then performs an onboard control algorithm 98 that uses these measurements as inputs (step 902). These inputs are analyzed to determine the estimated torque output of the pump element 28 (step 904). The controller 32 also obtains an output torque target (step 906). This output torque target can be obtained from data tables or from an external controller 32 of the vehicle 160, or from some other source. The motor 100 then operates to minimize deviation between the estimated torque output and the output torque target (step 908).

Figure 24:
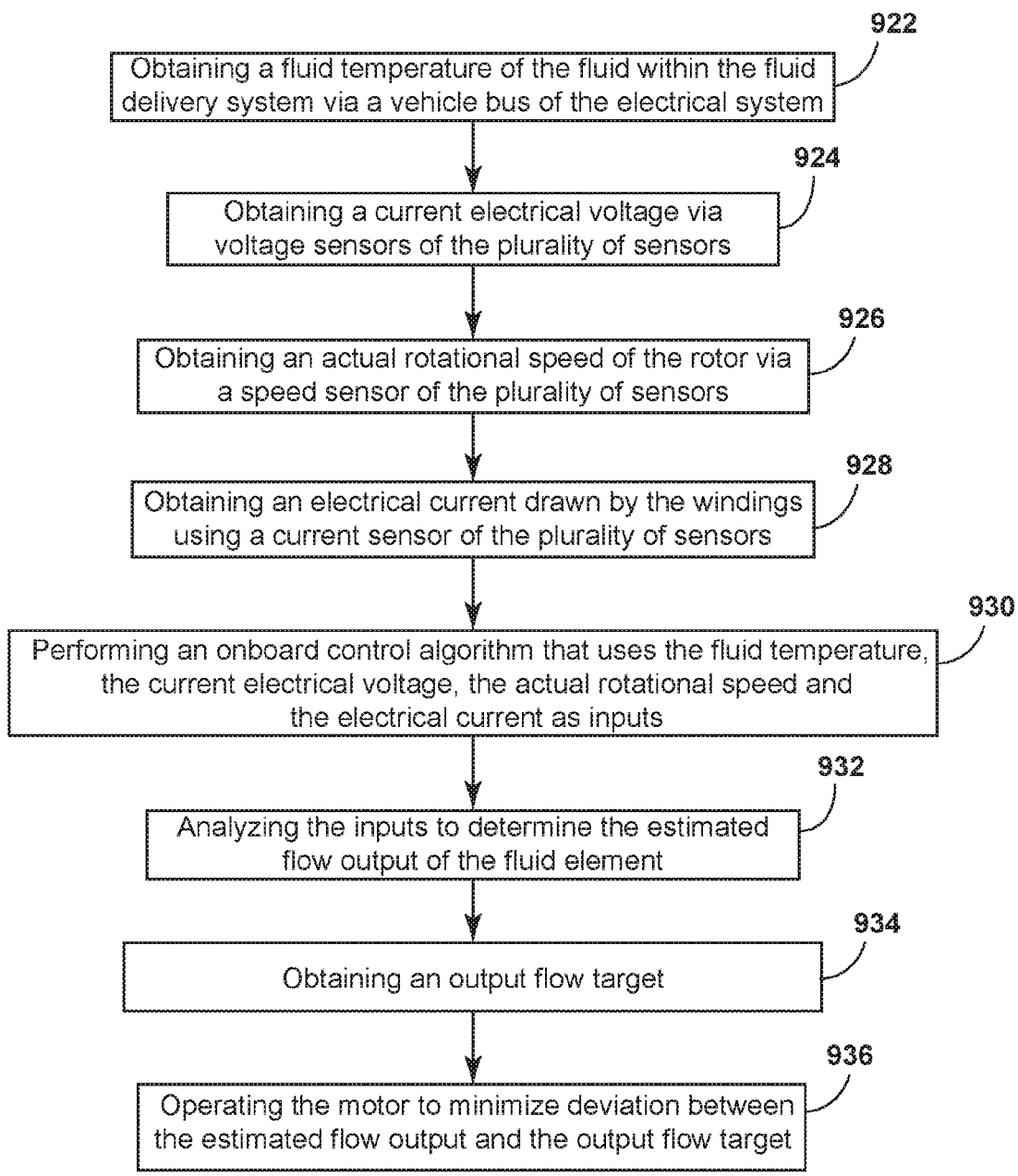
FIG. 24 is a schematic flow diagram illustrating a method for operating an onboard control algorithm within a controller of the fluid pump to determine operational output.

Referring now to FIG. 24, a subroutine 920 generates an output related to an estimated flow output of the pump element 28. According to subroutine 920, the controller 32 obtains a fluid temperature of fluid 14 within the fluid-delivery system 12 (step 922), obtains a current electrical voltage via voltage sensors (step 924), obtains an actual rotational speed of the rotor via a speed sensor (step 926), and obtains an electrical current drawn by the windings 20 using a current sensor (step 928). The controller 32 then performs an onboard control algorithm 98 that utilizes these measured parameters as inputs (step 930). These inputs are analyzed to determine the estimated flow output of the pump element 28 (step 932). An output flow target is obtained either from the data tables, from the vehicle 160 or from an external source (step 934). The motor 100 then operates to minimize the deviation between the estimated flow output and the output flow target (step 936).

The various data points and benchmarks described herein can be utilized for maintaining operation of the vehicle 160 during its effective lifespan. This data can also be used as troubleshooting information for the design of future fluid pumps 10 that may mitigate certain issues that may be experienced within a certain percentage of fluid pumps 10. For future manufacture of fluid pumps 10, the various information can be uploaded to the manufacturer at a central location. This information can be communicated directly within the vehicle 160 via remote connection or can be delivered to the manufacturer from various service stations, manufacturers and other vehicle-related businesses.

The fluid pump 10 described herein can be any of various fluid pumps 10 that can include, but are not limited to, fluid pumps 10 having a single pump element 28, dual-pump/single motor fluid pumps, rotational fluid pumps, piston-operated fluid pumps, and other similar fluid pumps that are used to provide cooling/lubrication to various components of vehicles 160, and other mechanical applications.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A fluid pump comprising:
   an outer housing;
   a motor disposed within the outer housing, the motor including a stator and a rotor in electromagnetic communication with the stator, wherein windings are disposed on the stator that receive an electric current for defining the electromagnetic communication;
   a pump element attached to the rotor via a drive shaft, wherein the pump element operates with the rotor to deliver a fluid through a hydraulic fluid path, wherein the pump element is a polymer-based pump element, wherein debris within the fluid is at least partially embedded and captured within polymer material of the polymer-based pump element;
   a plurality of sensors that measure information related to at least one of the stator, the windings, the rotor, the pump element, the fluid and the hydraulic fluid path; and
   a controller in communication with the windings for delivering the electric current to the windings, wherein the controller is also in communication with the plurality of sensors for measuring and recording the information and communicating this information to one of an external memory and an external controller.

2. The fluid pump of claim 1, wherein the plurality of sensors include an accelerometer that is in communication with at least one of the rotor, the drive shaft and the pump element, wherein the controller and the accelerometer cooperate to monitor the pump element for operating shock events, wherein the controller and the accelerometer are configured to:
   compare the operating shock event with an internal acceptance threshold; and
   time stamp the operating shock event when the operating shock event exceeds the internal acceptance threshold and communicate the operating shock event to an internal memory as a mechanical shock risk event.

3. The fluid pump of claim 2, wherein the controller compares the operating shock event in isolation against the internal acceptance threshold to derive the mechanical shock risk event, and wherein the operating shock event is indicative of the debris being within the fluid that at least partially interrupts operation of the pump element.

4. The fluid pump of claim 2, wherein the controller compares the operating shock event and previously recorded shock events, collectively, against the internal acceptance threshold to drive the mechanical shock risk event, and wherein the operating shock event is indicative of the debris being within the fluid that at least partially interrupts operation of the pump element.

5. The fluid pump of claim 2, wherein the accelerometer is coupled with the pump element.

6. The fluid pump of claim 1, wherein the plurality of sensors includes at least one of:
   an optic sensor that is positioned relative to the hydraulic fluid path and that monitors the fluid to detect a clarity of the fluid flowing through the hydraulic fluid path;
   a temperature sensor that measures a temperature of the fluid moving through the hydraulic fluid path;
   a current sensor that is in communication with the windings; and
   a positive temperature coefficient (PTC) resistor.

7. The fluid pump of claim 6, wherein the plurality of sensors includes the PTC resistor, and wherein the PTC resistor is located proximate a Field-Effect Transistor (FET) of the motor for determining a bridge temperature of the PTC resistor by monitoring a resistance change across the PTC resistor.

8. The fluid pump of claim 6, wherein the plurality of sensors includes the current sensor and the temperature sensor, and wherein the temperature of the fluid at a restriction is compared with an electrical current drawn by the windings as measured by the current sensor, wherein the temperature and the electrical current are compared against one another to derive a percentage of oil life remaining.

9. The fluid pump of claim 1, wherein the windings include three separate windings and wherein the plurality of sensors include current sensors that are in communication with at least one of the three separate windings, respectively, wherein the three separate windings include a U-phase winding, a V-phase winding and a W-phase winding, and wherein the current sensors cooperate with the controller to operate a Single-Shunt Field-Oriented Control Algorithm in communication with one of the three separate phase windings that includes an estimate of an RMS Phase Current for each respective winding of the three separate phase windings.

10. The fluid pump of claim 1, wherein the controller operates a Field-Oriented Control Algorithm that monitors itself and an operation of the motor to determine when the motor is in one of a closed-loop control state, an open-loop control state and a phase advanced state.

11. The fluid pump of claim 1, wherein the plurality of sensors includes a rotational speed sensor and a torque sensor that are in communication with the motor, wherein the controller monitors at least one of a command speed of the rotor and a torque output of the rotor to perform an onboard control algorithm, wherein the command speed and the torque output are compared against values of an information table that are indicative of normal operation of the motor, wherein when at least one of the command speed and the torque output have deviated outside of the values of the information table, the controller communicates a signal that is indicative of a need for calibrating the motor.

12. The fluid pump of claim 1, wherein the hydraulic fluid path includes a switching valve, and wherein the plurality of sensors include a temperature sensor for monitoring a temperature of the fluid, a current sensor for measuring an electrical current drawn by the windings, and a speed sensor for measuring a rotational speed of the rotor, wherein the controller compares the temperature of the fluid, the electrical current and the rotational speed of the rotor against values of an information table that are indicative of a normal operation of the motor.

13. The fluid pump of claim 1, wherein the plurality of sensors includes a run-time sensor that measures a length of time that the motor has been operating and a temperature sensor that measures a temperature of the fluid moving through the hydraulic fluid path, wherein when the controller operates an onboard control algorithm that monitors the length of time that the motor has been operating at a certain temperature to derive a monitored run-time/temperature value and compares the monitored run-time/temperature value against acceptable run-time/temperature values of an information table to determine a percentage of life remaining of the fluid.

14. The fluid pump of claim 1, wherein the controller operates an onboard control algorithm which monitors operating conditions of the motor and the hydraulic fluid path and also monitors internal fault conditions of the controller, wherein when the internal fault conditions cannot be corrected, the controller communicates a signal that is indicative of said fluid pump needing replacement.

15. The fluid pump of claim 1, wherein the controller cooperates with the plurality of sensors to operate an onboard control algorithm that selectively samples operating parameters at a rate that is 10× faster than a baud rate at which the controller operates, wherein the onboard control algorithm cooperates with the controller to deliver the operating parameters to an onboard memory.

16. The fluid pump of claim 1, wherein the outer housing includes a recessed cavity that gravimetrically captures large particles of the debris and prevents entry of the large particles from entering the pump element.

17. The fluid pump of claim 1, wherein the polymer-based pump element is a metallic member having a coating of a polymer-based material surrounding the metallic member.

18. The fluid pump of claim 1, wherein the controller includes an internal memory that includes a read-only memory that contains the manufacture date of the controller and the motor.

19. The fluid pump of claim 18, wherein the read-only memory includes a random-access memory that records whether software of the controller has been updated since the manufacture date of the controller.

20. The fluid pump of claim 1, wherein the fluid is one of a coolant and a lubricant.

\* \* \* \* \*